(12) United States Patent
Yoshida et al.

(10) Patent No.: US 7,695,132 B2
(45) Date of Patent: Apr. 13, 2010

(54) EYEGLASS SET

(75) Inventors: Takehiko Yoshida, Osaka (JP);
Mitsuhisa Uekaji, Osaka (JP)

(73) Assignee: Vision Optic Co., Ltd., Osaka (JP)

( * ) Notice: Subject to any disclaimer, the term of this patent is extended or adjusted under 35 U.S.C. 154(b) by 8 days.

(21) Appl. No.: 12/090,517

(22) PCT Filed: Jun. 18, 2007

(86) PCT No.: PCT/JP2007/062228

§ 371 (c)(1),
(2), (4) Date: Sep. 25, 2008

(87) PCT Pub. No.: WO2007/148650

PCT Pub. Date: Dec. 27, 2007

(65) Prior Publication Data

US 2009/0296041 A1    Dec. 3, 2009

(30) Foreign Application Priority Data

Jun. 20, 2006 (JP) .............................. 2006-170398
Apr. 19, 2007 (JP) .............................. 2007-002804

(51) Int. Cl.
*G02C 9/00* (2006.01)
(52) U.S. Cl. .......................................... 351/47; 351/57
(58) Field of Classification Search ................ 351/47, 351/48, 57, 58, 41, 44
See application file for complete search history.

(56) References Cited

U.S. PATENT DOCUMENTS 5,614,963 A * 3/1997 Parker ......................... 351/47
5,943,114 A * 8/1999 Grendelmeier ............... 351/47
6,398,362 B1   6/2002 Masunaga
7,011,407 B2 * 3/2006 Xie ............................. 351/124
7,540,606 B2 * 6/2009 Huang ......................... 351/57
2001/0028433 A1 10/2001 Nakamura et al.

FOREIGN PATENT DOCUMENTS

| JP | 44-19757 B1 | 8/1969 |
| JP | 2001-350121 A | 12/2001 |
| JP | 2003-084247 A | 3/2003 |
| JP | 3106375 U | 1/2005 |

OTHER PUBLICATIONS

International Search Report of PCT/JP2007/062228, date of mailing Sep. 4, 2007.

* cited by examiner

*Primary Examiner*—Hung X Dang
(74) *Attorney, Agent, or Firm*—Westerman, Hattori, Daniels & Adrian, LLP

(57) ABSTRACT

The present invention aims to provide an eyeglass set that is easy to manufacture and that can be used as a prescription sunglass having excellent designability. The present invention provides an eyeglass set 1 where a front sunglass lens member 3 includes projections 33 projecting towards the back side and each being formed with a cutout 331; the prescription eyeglass 2 includes left and right elastic arms 214 respectively attached with a nose pad 215; and the left and right arms 214 are biased in opposite directions to each other and the left and right arms 214 are elastically deformed in left and right opposite directions to elastically engage the cutouts 331 of the projections 33 so that the front sunglass lens member 3 attaches to the front surface side of the front frame 21 of the prescription eyeglass 2.

11 Claims, 19 Drawing Sheets

EYEGLASS SET

TECHNICAL FIELD

The present invention relates to an eyeglass set that provides an excellent designability.

BACKGROUND ART

Needs for sunglasses with excellent designability are increasing in recent years. Thus, various sunglasses with excellent designability have been recently being commercialized. One of the sunglasses with excellent designability is a sunglass in which a front frame including left and right sunglass lenses is curved at a large curvature so as to extend along the face. The sunglass in which the front frame is curved at a large curvature shields the light from the sides, and thus has an advantage of further suppressing brightness.

Sunglasses include near-sighted or bifocal prescription sunglasses where left and right sunglass lenses are prescribed. Needs for a prescription sunglass in which the front frame is curved at a large curvature is also increasing for such prescription sunglasses.

DISCLOSURE OF THE INVENTION

The prescription sunglass adjusts the focus of the user's eyes with left and right sunglass lenses. Thus, the left and right sunglass lenses are designed based on eyesight and the like of the user. In the case of prescription sunglasses, the shape of the front frame is restricted by the eyesight and the like of the user. The manufacturing of prescription sunglasses in which the front frame is curved at a large curvature is thus sometimes difficult.

In view of solving the problems of a conventional art, the present invention aims to provide an eyeglass set capable of being used as a prescription sunglass that is easy to manufacture, has excellent designability, and has a function of adjusting the focus of the user's eyes.

SUMMARY OF THE INVENTION

A first aspect of the present invention provides an eyeglass set comprising: a prescription eyeglass including a front frame with left and right prescription lenses, and left and right temples; and a front sunglass lens member having a curvature larger than the front frame of the prescription eyeglass and being removably attached to a front surface side of the front frame of the prescription eyeglass; wherein the front sunglass lens member includes projections projecting towards the back side and each being formed with a cutout on the lateral side; the prescription eyeglass further includes left and right elastic arms respectively attached with a nose pad; and the left and right arms are biased in opposite directions to each other and are elastically engaged to the cutouts of the projections while being elastically deformed in left and right opposite directions so that the front sunglass lens member attaches to the front surface side of the front frame of the prescription eyeglass.

The eyeglass set according to the first aspect includes a front sunglass lens member and a prescription eyeglass. The front sunglass lens member includes projections projecting toward the back side and each being formed with a cutout on the lateral side. The prescription eyeglass includes left and right arms each having elasticity and being attached with a nose pad. The left and right arms are biased in opposite directions to each other, and elastically engaged to the cutouts of the projections while being elastically deformed in opposite directions to the left and the right. Thus, the front sunglass lens member comes to rest at a position where a biasing force balances when the left and right arms biased in opposite directions to each other elastically engage the projections. Furthermore, the movement in a front and back direction of the projections, and furthermore, the front sunglass lens member is hampered when the arms are engaged to the cutouts formed on the lateral side of the projections. The front sunglass lens member is attached to the prescription eyeglass by the engagement of the projections and the arms. Since the projections arranged on the front sunglass lens member are projected towards the back side, the front sunglass lens member is attached to a front surface side of the front frame of the prescription eyeglass when the projections and the arms engage. The front sunglass lens member is detached from the prescription eyeglass by disengaging the projections and the arms.

As described above, the prescription eyeglass is hidden by the front sunglass lens member in front view of the eyeglass set according to the first aspect by attaching the front sunglass lens member to the front surface side of the front frame of the prescription eyeglass. Therefore, the eyeglass set according to the first aspect has an outer appearance similar to the sunglass in which the front frame is curved at a large curvature so as to extend along the face in front view by forming the front sunglass lens member to a shape curved having a large curvature so as to extend along the face.

The front sunglass lens member has a (plano) lens without the function of adjusting the focus. The plano lens includes colored sunglass lens, sunglass lens with polarization property, and the like. Since the lens arranged in the front sunglass lens member does not have the function of adjusting the focus, the adjustment amount of the focus of the eyeglass set according to the first aspect does not change even if the curvature of the front sunglass lens member is changed. Therefore, the curvature of the front sunglass lens member is not restricted by the adjustment amount of the focus. Therefore, the front sunglass lens member curved at a large curvature so as to extend along the face thus becomes easy to manufacture.

The front sunglass lens member is positioned on a front surface side of the prescription lens of the prescription eyeglass by attaching the front sunglass lens member to the front surface side of the front frame of the prescription eyeglass. When the front sunglass lens member is positioned on the front surface side of the prescription lens, the user of the eyeglass set according to the first aspect can see objects through the prescription lens and the front sunglass lens member. Therefore, the eyeglass set according to the first aspect can be used as the prescription sunglass having a function of adjusting the focus of the user's eyes by attaching the front sunglass lens member to the front surface side of the front frame of the prescription eyeglass.

The eyeglass set according to the first aspect thus can be used as a prescription sunglass that is easy to manufacture, has excellent designability, and has a function of adjusting the focus of the user's eyes.

In the eyeglass set according to the first aspect, the prescription eyeglass can be used as the prescription eyeglass itself if the front sunglass lens member is detached from the prescription eyeglass. The front sunglass lens member of the eyeglass set according to the first aspect is removably attached to the prescription eyeglass. Therefore, the eyeglass set according to the first aspect can be used as a prescription sunglass of various designs by preparing a plurality of front sunglass lens members of various designs, and changing the front sunglass lens member to be attached to the prescription eyeglass. For instance, the eyeglass set according to the first aspect can be used as a prescription sunglass of a design suited to TPO by changing the front sunglass lens member according to TPO.

A second aspect of the present invention provides an eyeglass set comprising: a prescription eyeglass including a front frame with left and right prescription lenses, and left and right temples; and a front member removably attached to a front surface side of the front frame of the prescription eyeglass; wherein the front member includes, a sunglass lens having a curvature larger than the front frame of the prescription eyeglass, projections projecting towards the back side and each being formed with a cutout on the lateral side, and an attachment part for pivotally connecting the sunglass lens and the projections and enabling the sunglass lens to switch to between a state of being positioned on the front surface side of the front frame of the prescription eyeglass and a state of being flipped upward from the state positioned on the front surface side by pivoting the sunglass lens with respect to the projections; the prescription eyeglass further includes left and right elastic arms respectively attached with a nose pad; and the left and right arms are biased in opposite directions to each other and are elastically engaged to the cutouts of the projections while being elastically deformed in left and right opposite directions so that the front member attaches to the front surface side of the front frame of the prescription eyeglass.

In the eyeglass set according to the second aspect, the attachment of the front member to the prescription eyeglass is carried out by engaging the projections and the arms, similar to the eyeglass set according to the first aspect. The detachment of the front member from the prescription eyeglass is carried out by disengaging the projections and the arms, similar to the eyeglass set according to the first aspect.

The eyeglass set according to the second aspect includes a prescription eyeglass and a front member to be attached to the front surface side of the front frame of the prescription eyeglass. The front member is provided with a piano sunglass lens. The plano sunglass lens includes colored sunglass lens, sunglass lens with polarization property, and the like. The sunglass lens can take between a state positioned on the front surface side of the front frame of the prescription eyeglass or a state flipped upward from the state positioned on the front surface side.

In the eyeglass set according to the second aspect, the user of the eyeglass set can see objects through the prescription lens of the prescription eyeglass and the sunglass lens of the front member when the sunglass lens is positioned on the front surface side of the front frame of the prescription eyeglass. Therefore, the eyeglass set according to the second aspect can be used as a prescription sunglass having a function of adjusting the focus of the user's eyes when the sunglass lens is positioned on the front surface side of the front frame of the prescription eyeglass. Moreover, the prescription eyeglass is hidden by the sunglass lens in front view of the eyeglass set according to the second aspect when the sunglass lens is positioned on the front surface side of the front frame of the prescription eyeglass. The front member curved at a large curvature so as to extend along the face is easy to manufacture since the sunglass lens does not have the function of adjusting the focus. The eyeglass set according to the second aspect thus can be used as the prescription sunglass that is easy to manufacture and has excellent designability, similar to the eyeglass set according to the first aspect.

The user of the eyeglass set can see objects through only the prescription lens arranged in the prescription eyeglass when the sunglass lens is flipped upward. In the eyeglass set according to the second aspect, the view in dark places is prevented from degrading while maintaining the function of adjusting the focus of the user's eyes by flipping the sunglass lens upward when entering dark places such as tunnel. Therefore, the eyeglass set according to the second aspect prevents the view from degrading without taking off the sunglass lens by flipping the sunglass lens upward. The eyeglass set according to the second aspect can be used as a user friendly sunglass that is easy to manufacture, has excellent designability, and has a function of adjusting the focus of the user's eyes.

The prescription eyeglass can be used as the prescription eyeglass itself if the front member is detached from the prescription eyeglass in the eyeglass set according to the second aspect. The front member of the eyeglass set according to the second aspect is removably attached to the prescription eyeglass. Therefore, the eyeglass set according to the second aspect can be used as a prescription sunglass of various designs by preparing a plurality of front members of various designs, and changing the front member to be attached to the prescription eyeglass. For instance, the eyeglass set according to the second aspect can be used as a prescription sunglass of a design suited to TPO by changing the front member according to TPO.

In the preferable configuration of the eyeglass sets of the first aspect and the second aspect, the prescription eyeglass further includes pass-through holes extending in a front and back direction, the cutouts are formed at positions of being exposed to the outside of the pass-through holes while the projections are inserted to the pass-through holes, and the left and right arms elastically engage the cutouts when the projections are inserted to the pass-through holes.

According to the preferable configuration, the movement in the up and down and left and right directions of the projections with respect to the prescription eyeglass is hampered since the projections are inserted to a pass-through holes extending in the front and back direction in the prescription eyeglass. Thus, in the eyeglass set according to the first aspect, the attachment states of the projections, and furthermore, the front sunglass lens member to the prescription eyeglass stabilizes. Furthermore, in the eyeglass set according to the second aspect, the attachment states of the projections, and furthermore, the front member to the prescription eyeglass stabilizes. Since a cutout is formed at a position exposed to outside the pass-through hole while the projection is inserted to the pass-through hole, the engagement of the arms and the cutouts is not inhibited even if the projection is inserted to the pass-through hole. Therefore, according to the preferable configuration, the attachment state of the front sunglass lens member to the prescription eyeglass stabilizes without inhibiting the engagement of the arms and the cutouts in the eyeglass set according to the first aspect. The attachment state of the front member to the prescription eyeglass stabilizes without inhibiting the engagement of the arms and the cutouts in the eyeglass set according to the second aspect.

A third aspect of the present invention provides an eyeglass set comprising: a prescription eyeglass including a front frame with left and right prescription lenses, and left and right temples; and a front sunglass lens member having a curvature larger than the front frame of the prescription eyeglass and being removably attached to a front surface side of the front frame of the prescription eyeglass; wherein the prescription eyeglass further includes projections projecting towards the front side and each being formed with a cutout on the lateral side; the front sunglass lens member further includes left and right elastic arms respectively attached with a nose pad; and the left and right arms are biased in opposite directions to each other and are elastically engaged to the cutouts of the projections while being elastically deformed in left and right opposite directions so that the front sunglass lens member attaches to the front surface side of the front frame of the prescription eyeglass.

The eyeglass set according to the third aspect differs from the eyeglass set according to the first aspect in that the projections are arranged on the prescription eyeglass and the arms are arranged on the front sunglass lens member. The eyeglass set according to the third aspect has effects similar to the effects of the eyeglass set of the first aspect.

In the preferable configuration of the eyeglass set of the third aspect, the front sunglass lens member further includes pass-through holes extending in a front and back direction, the cutouts are formed at positions of being exposed to the outside of the pass-through holes while the projections are inserted to the pass-through holes, and the left and right arms elastically engage the cutouts when the projections are inserted to the pass-through holes.

According to the preferable configuration, the attachment state of the front sunglass lens member to the prescription eyeglass stabilizes without inhibiting the engagement of the arms and cutouts, similar to the preferable configuration of the first aspect.

A fourth aspect of the present invention provides an eyeglass set comprising: a prescription eyeglass including a front frame with left and right prescription lenses, and left and right temples; and a front member removably attached to a front surface side of the front frame of the prescription eyeglass; wherein the front member includes, a sunglass lens having a curvature larger than the front frame of the prescription eyeglass, left and right elastic arms respectively attached with a nose pad, and an attachment part for pivotally connecting the sunglass lens and the left and right arms and enabling the sunglass lens to switch to between a state of being positioned on the front surface side of the front frame of the prescription eyeglass and a state of being flipped upward from the state positioned on the front surface side by pivoting the sunglass lens with respect to the left and right arms; the prescription eyeglass further includes projections projecting towards the front side and each being formed with a cutout on the lateral side; and the left and right arms are biased in opposite directions to each other and are elastically engaged to the cutouts of the projections while being elastically deformed in left and right opposite directions so that the front member attaches to the front surface side of the front frame of the prescription eyeglass.

The eyeglass set according to the fourth aspect differs from the eyeglass set according to the second aspect in that the projections are arranged on the prescription eyeglass, and the arms are arranged on the front member. The eyeglass set according to the fourth aspect has effects similar to the eyeglass set of the second aspect.

In the preferable configuration of the eyeglass set of the fourth aspect, the front member further includes a coupling strip with pass-through holes extending in the front and back direction, the attachment part pivotally connects the sunglass to the left and right arms and the coupling strip, and pivots the sunglass lens with respect to the left and right arms and the coupling strip to switch the sunglass lens between the state of being positioned on the front surface side of the front frame of the prescription eyeglass and the state of being flipped upward from the state positioned on the front surface side, the cutouts are formed at positions of being exposed outside the pass-through holes while the projections are inserted to the pass-through holes, and the left and right arms elastically engage the cutouts when the projections are inserted to the pass-through holes.

According to the preferable configuration, the attachment state of the front member to the prescription eyeglass stabilizes without inhibiting the engagement of the arms and the cutouts, similar to the preferable configuration of the second aspect.

A fifth aspect of the present invention provides an eyeglass set comprising: a sunglass including a front frame with a sunglass lens, and temples; and an inner eyeglass including left and right prescription lenses, having a curvature smaller than the front frame of the sunglass, and being removably attached to a back surface side of the front frame of the sunglass; wherein the sunglass further includes projections projecting towards the back side and each being formed with a cutout on the lateral side; the inner eyeglass further includes left and right elastic arms respectively attached with a nose pad; and the left and right arms are biased in opposite directions to each other and are elastically engaged to the cutouts of the projections while being elastically deformed in left and right opposite directions so that the inner eyeglass attaches to the back surface side of the front frame of the sunglass.

The eyeglass set according to the fifth aspect includes the sunglass and an inner eyeglass. The attachment of the inner eyeglass to the sunglass is carried out by engaging the projections arranged on the sunglass and the arms arranged on the inner eyeglass. The detachment of the inner eyeglass from the sunglass is carried out by disengaging the projections and the arms.

The inner eyeglass is hidden by the sunglass in front view of the eyeglass set according to the fifth aspect by attaching the inner eyeglass to a back surface side of the front frame of the sunglass. Therefore, the eyeglass set according to the fifth aspect has an outer appearance similar to the sunglass in which the front frame is curved at a large curvature so as to extend along the face in front view by forming the front frame of the sunglass to a shape curved at a large curvature to extend along the face.

The sunglass lens arranged in the sunglass is a plano sunglass lens. The plano sunglass lens includes colored sunglass lens, sunglass lens having a polarization property, and the like. Thus, the adjustment amount of the focus of the eyeglass set according to the fifth aspect does not change even if the curvature of the front frame of the sunglass is changed since the sunglass lens does not have the function of adjusting the focus. Therefore, the curvature of the front frame of the sunglass is not restricted by the adjustment amount of the focus. The sunglass in which the front frame is curved at a large curvature so as to extend along the face thus becomes easy to manufacture.

The prescription lens of the inner eyeglass is positioned on a back surface side of the sunglass lens arranged in the sunglass by attaching the inner eyeglass to a back surface side of the front frame of the sunglass. When the prescription lens is positioned on the back surface side of the sunglass lens, the user of the eyeglass set according to the fifth aspect can see objects through the prescription lens and the sunglass lens. Therefore, the eyeglass set of the fifth aspect can be used as a prescription sunglass having a function of adjusting the focus of the user's eyes by attaching the inner eyeglass to the back surface side of the front frame of the sunglass.

The eyeglass set according to the fifth aspect can be used as a prescription sunglass that is easy to manufacture, has excellent designability, and has a function of adjusting the focus of the user's eyes.

In the eyeglass set according to the fifth aspect, the sunglass can be used as the sunglass itself if the inner eyeglass is detached from the sunglass. The inner eyeglass of the eyeglass set according to the fifth aspect is removably attached to the sunglass. Therefore, the eyeglass set according to the fifth aspect can be used as the prescription sunglass of various designs by preparing a plurality of sunglasses of various designs, and changing the sunglass to be attached to the inner eyeglass with prescription lens corresponding to the eyesight and the like of the user. The eyeglass set according to the fifth aspect thus can be used as the prescription sunglass of a design suited to TPO by changing the sunglass according to TPO.

In the preferable configuration of the eyeglass set of the fifth aspect, the inner eyeglass further includes pass-through holes extending in a front and back direction, the cutouts are formed at positions of being exposed to the outside of the pass-through holes while the projections are inserted to the pass-through holes and the left and right arms elastically engage the cutouts when the projections are inserted to the pass-through holes.

According to the preferable configuration, the movement in the up and down and left and right directions of the projection with respect to the inner eyeglass is hampered since the projections are inserted to the pass-through hole extending in the front and back direction formed in the inner eyeglass. The attachment state of the projections, and furthermore, the inner eyeglass to the sunglass thus can be stabilized. Since the cutout is formed at the position exposed to the outside of the pass-through hole while the projection is inserted to the pass-through hole, the engagement of the arms and the cutouts are not inhibited even if the projection is inserted to pass-through hole. Therefore, according to the preferable configuration, the attachment of the inner eyeglass to the sunglass stabilizes without inhibiting the engagement of the arms and the cutouts.

A sixth aspect of the present invention provides an eyeglass set comprising: a sunglass including a front frame with a sunglass lens, and temples; and an inner eyeglass including left and right prescription lenses, having a curvature smaller than the front frame of the sunglass, and being removably attached to a back surface side of the front frame of the sunglass; wherein the inner eyeglass further includes projections projecting towards the front side and each being formed with a cutout on the lateral side; the sunglass further includes left and right elastic arms respectively attached with a nose pad; and the left and right arms are biased in opposite directions to each other and are elastically engaged to the cutouts of the projections while being elastically deformed in left and right opposite directions so that the inner eyeglass attaches to the back surface side of the front frame of the sunglass.

The eyeglass set according to the sixth aspect differs from the eyeglass set according to the fifth aspect in that the projections are arranged on the inner eyeglass, and the arms are arranged on the sunglass. The eyeglass set according to the sixth aspect has effects same as the effects of the eyeglass set according to the fifth aspect.

In the preferable configuration of the eyeglass set of the sixth aspect, the sunglass further includes pass-through holes extending in a front and back direction, the cutouts are formed at positions of being exposed to the outside of the pass-through holes while the projections are inserted to the pass-through holes, and the left and right arms elastically engage the cutouts when the projections are inserted to the pass-through holes.

According to the preferable configuration, the attachment state of the inner eyeglass to the sunglass stabilizes without inhibiting the engagement of the arms and the cutouts, similar to the preferable configuration of the fifth aspect.

BRIEF DESCRIPTION OF THE DRAWINGS

FIG. 1 (FIG. 1A to FIG. 1C) are outer appearance views of an eyeglass set according to a first embodiment.

FIG. 2 (FIGS. 2A and 2B) are outer appearance views of a front frame of the first embodiment.

FIG. 3 (FIGS. 3A and 3B) are outer appearance views of a front sunglass lens member of the first embodiment.

FIG. 6 (FIG. 6A to FIG. 6D) are outer appearance views of a front member of the second embodiment. FIG. 6A is a rear view.

FIG. 7 (FIGS. 7A and 7B) are cross sectional views taken along line VII-VII of FIG. 5A showing a positional relationship between the prescription lens and the sunglass lens.

FIG. 9 (FIGS. 9A and 9B) are outer appearance views of a front sunglass lens member of an eyeglass set according to a third embodiment.

FIG. 11 (FIGS. 11A and 11B) are outer appearance views of an eyeglass set according to a fourth embodiment.

FIG. 13 (FIG. 13A to FIG. 13D) are outer appearance views of a front member of the fourth embodiment.

FIG. 14 (FIGS. 14A and 14B) are cross sectional views taken along line XIV-XIV of FIG. 11A showing a positional relationship between the prescription lens and the sunglass lens in the fourth embodiment.

FIG. 15 (FIGS. 15A and 15B) are views describing a configuration where the sunglass lens can be switched to three states.

FIG. 16 (FIGS. 16A and 16B) are outer appearance views of an eyeglass set according to a fifth embodiment.

FIG. 18 (FIGS. 18A and 18B) are outer appearance views of an eyeglass set according to a sixth embodiment.

BEST MODE FOR CARRYING OUT THE INVENTION

First Embodiment

Figure 1A:
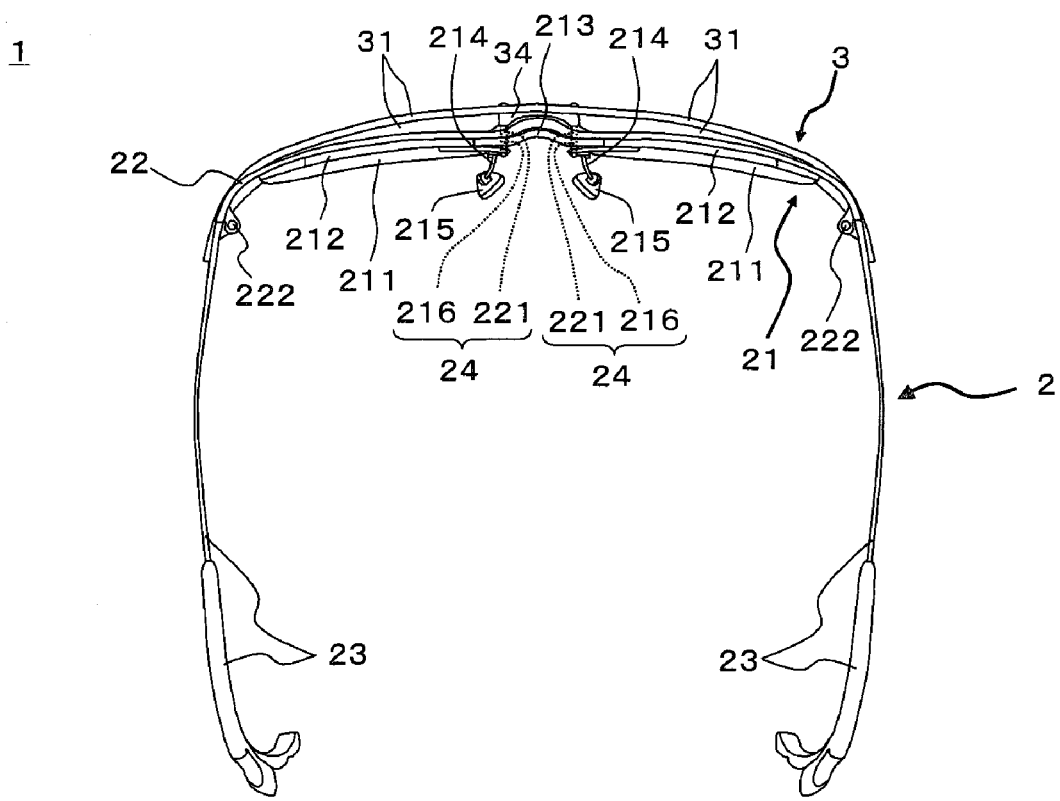
FIG. 1A is a plan view.
Figure 1B:
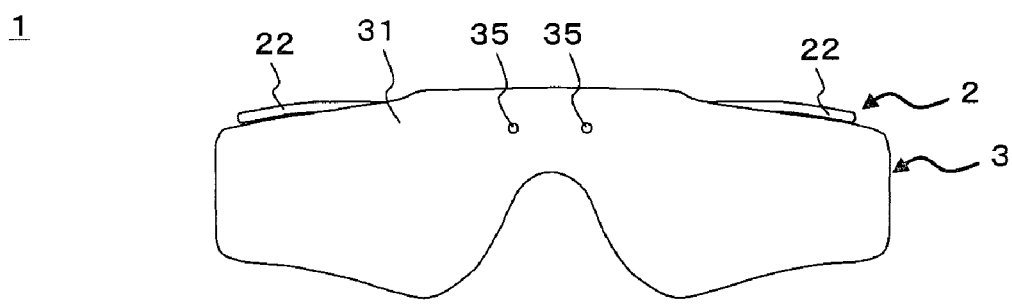
FIG. 1B is a front view.
Figure 1C:
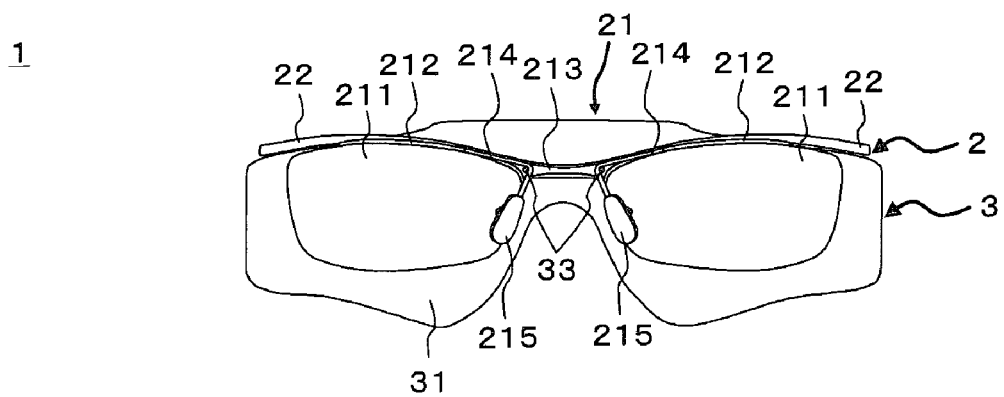
FIG. 1C is a rear view.

FIG. 1 (FIG. 1A to FIG. 1C) are outer appearance views of an eyeglass set according to a first embodiment. FIG. 1A is a plan view. FIG. 1B is a front view. FIG. 1C is a rear view. In FIG. 1C, the illustration of temples and hinge structures (hereinafter described) is omitted. As shown in FIG. 1A to FIG. 1C, the eyeglass set 1 is equipped with a prescription eyeglass 2 including a front frame 21 with left and right prescription lenses 211 and left and right temples 23, and a front sunglass lens member 3 having a curvature larger than the front frame 21 of the prescription eyeglass 2 and being removably attached to a front surface side of the front frame 21 of the prescription eyeglass 2. The prescription eyeglass 2 includes an elongate member 22 in addition to the front frame 21 and the temples 23.

Figure 2A:
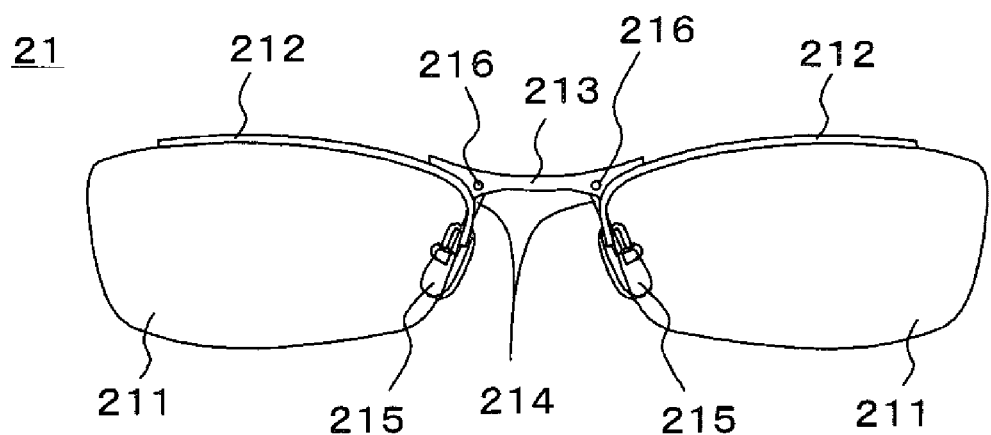
FIG. 2A is a front view.
Figure 2B:
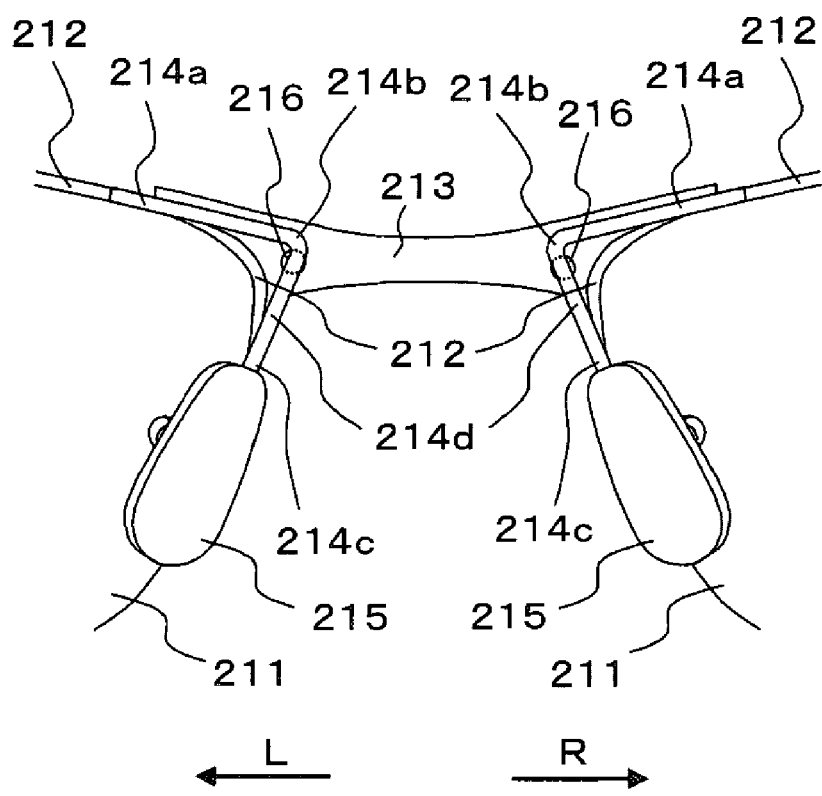
FIG. 2B is an enlarged rear view of the vicinity of the left and right pass-through holes.

FIG. 2 (FIGS. 2A and 2B) are outer appearance views of a front frame of the first embodiment. FIG. 2A is a front view. FIG. 2B is an enlarged rear view of the vicinity of the left and right pass-through holes. As shown in FIGS. 2A and 2B, the front frame 21 includes left and right prescription lenses 211, rim parts 212, a bridge part 213, left and right arms 214, nose pads 215, and pass-through holes 216.

The lens used for the left and right prescription lenses 211 is not particularly limited as long as the lens is prescribed, and may be colored lens or lens with polarization property.

The rim parts 212 are arranged along an outer peripheral of each left and light prescription lens 211 from an upper part thereof to the inner part thereof. The eyeglass in which the rim parts are arranged along an outer peripheral of each left and light prescription lens 211 from an upper part thereof to the inner part thereof is generally called a half-rim type.

The bridge part 213 connects the left and right rim parts 212. As shown in FIG. 1A, the bridge part 213 is curved so that a central part projects towards the front side according to the shape of the nose of the user of the prescription eyeglass 2.

As shown in FIG. 2B, the left and right arms 214 are formed to a substantially L-shape in which an intermediate part 214b is bent. A basal end 214a of each left and right arms 214 is attached to a back surface side of the rim part 212 through brazing and the like. The left arm 214 has the intermediate part 214b positioned on the right side in a substantially horizontal direction with respect to the basal end 214a and a distal end 214c positioned on the lower side with respect to the intermediate part 214b. The right arm 214 has the intermediate part 214b positioned on the left side in a substantially horizontal direction with respect to the basal end 214a and a distal end 214c positioned on the lower side with respect to the intermediate part 214b.

The left and right arm 214 have elasticity. When the left and right arms 214 are elastically deformed in a direction that the bent angle of the intermediate part 214b becomes larger, a biasing force acts in a direction that the bent angle becomes smaller. When the left and right arms 214 are elastically deformed in a direction that the bent angle of the intermediate part 214b becomes smaller, the biasing force acts in a direction that the bent angle becomes larger. Therefore, as shown in FIG. 2B, when the portion (hereinafter referred to as engagement part 214d) from the intermediate part 214b to the distal end 214c is moved towards a right (arrow R) direction, the biasing force for biasing the engagement part 214d towards a left (arrow L) direction acts on the left and right arms 214. As shown in FIG. 2B, the biasing force for biasing the engagement part 214d towards the right direction acts on the left and right arms 214 when the engagement part 214d is moved towards the left direction.

The nose pad 215 is attached to the distal end 214c of each left and right arms 214.

The pass-through hole 216 is a hole for passing the bridge part 213 in a front and back direction. The pass-through hole 216 is formed at two locations on the left and the right of the bridge part 213. As shown in FIG. 2B, the left pass-through hole 216 is formed on the front surface side of the engagement part 214d of the left arm 214 in a non-elastically deformed state. The right pass-through hole 216 is formed on the front surface side of the engagement part 214d of the right arm 214 in a non-elastically deformed state.

As shown in FIGS. 1A and 1B, the elongate member 22 is attached to a front surface side of the rim part 212 of the front frame 21 through brazing and the like. A central part in a left and right direction of the elongate member 22 is projected towards the front side according to the shape of the bridge part 213 of the front frame 21. The elongate member 22 has a pass-through hole 221 passing through in the front and back direction formed at two locations at the central part in the left and right direction. The spacing of the pass-through holes 221 is the same as the spacing of the pass-through holes 216 formed in the front frame 21. A pass-through hole 24 for passing the elongate member 22 and the front frame 21 in the front and back direction is formed by the pass-through hole 221 and the pass-through hole 216. Furthermore, a hinge structure 222 is attached to both ends in a left and right direction of the elongate member 22. The front end of the temple 23 is connected to the hinge structure 222. The temple 23 freely pivots with respect to the front frame 21 and the elongate member 22 by the hinge structure 222.

Figure 3A:
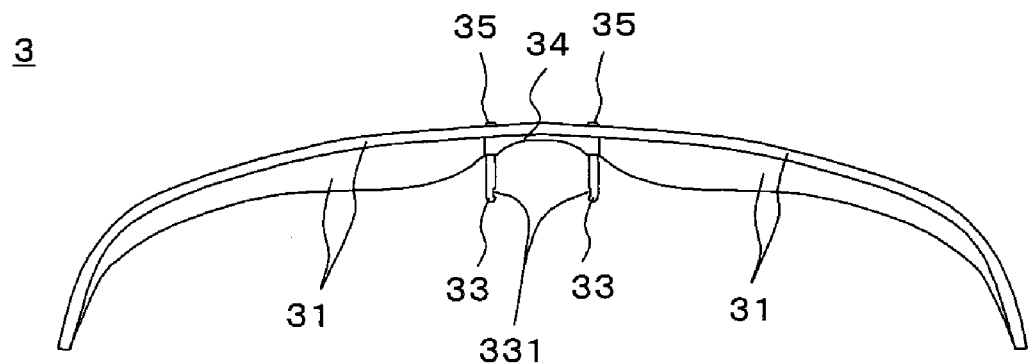
FIG. 3A is a plan view.
Figure 3B:
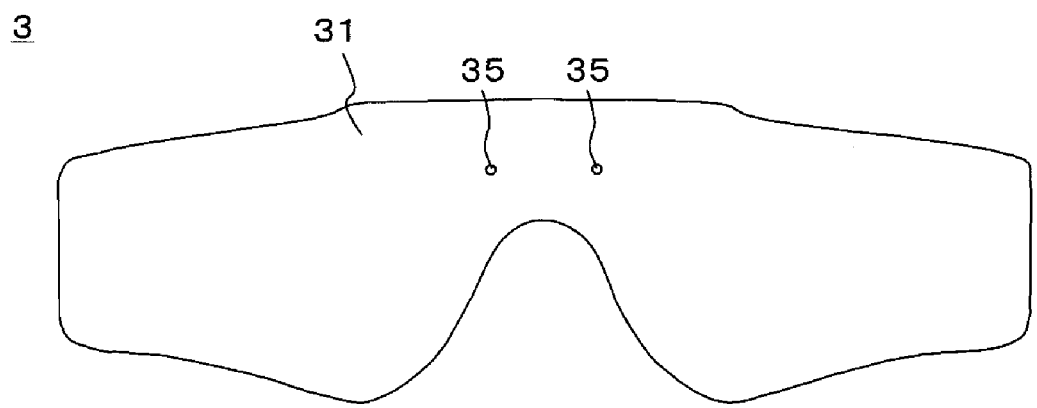
FIG. 3B is a front view.

FIG. 3 (FIGS. 3A and 3B) are outer appearance views of a front sunglass lens member of the first embodiment. FIG. 3A is a plan view. FIG. 3B is a front view. As shown in FIGS. 3A and 3B, the front sunglass less 3 includes a sunglass lens 31, projections 33, and a mount 34 for attaching the projections 33 to the sunglass lens 31.

The sunglass lens 31 is formed long in a left and right direction so as to cover the left eye and the right eyes of the user of the eyeglass set 1. That is, in the present embodiment, the sunglass lens 31 is used as the left sunglass lens that enters the view of the left eye and the right sunglass lens that enters the view of the right eye. The lens used for the sunglass lens 31 is not particularly limited to non-prescribed lens, and may be colored lens or lens with polarization property.

The sunglass lens 31 is formed to a curved surface so as to be positioned towards the back the closer to both left and right end sides with a central part positioned on the front side to extend along the face of the user. The curvature of the sunglass lens 31 is formed larger than the curvature of the front frame 21 of the prescription eyeglass 2. The curvature of the front frame 21 of the prescription eyeglass 2 is a curvature in which the curvature radius is between 250 and 450 mm. The curvature in which the curvature radius is between 250 and 450 mm is the curvature used for the front frame of a normal prescription eyeglass, and is a curvature with which the prescription eyeglass is relatively easily manufactured. The curvature of the sunglass lens 31 is not particularly limited as long as the curvature is larger than the curvature of the front frame 21 of the prescription eyeglass 2.

For instance, the curvature in which the curvature radius is between 80 and 150 mm may be used for the curvature of the sunglass lens 31. The curvature in which the curvature radius is between 80 and 150 mm is the curvature used for a lens referred to as 6 curve lens or 8 curve lens used in sports sunglass and the like with excellent designability.

The mount 34 is attached to a back surface side at the central part in a left and right direction of the sunglass lens 31. The attachment thereof is carried out by screws 35, as shown in FIGS. 3A and 3B.

The projections 33 are attached to the mount 34 so as to project towards the back side from a back surface side of the mount 34. Two projections 33 are attached on the mount 34 so as to be arranged side by side on the left and the right. The projections 33 are formed to a substantially circular cylinder shape. The spacing of the projections 33 is the same as the spacing of the pass-through holes 24, and the diameter of the projections 33 is smaller than that of the pass-through hole 24 so that the projections 33 can be inserted to the pass-through holes 24 of the prescription eyeglass 2.

The projection 33 has a cutout 331 formed on the lateral side. In the present embodiment, the cutout 331 is formed on the side at the central side of the front sunglass lens member 3. In other words, the cutout 331 is formed on a right side surface in the left projection 33, and the cutout 331 is formed on a left side surface in the right projection 33. The cutout 331 merely needs to be formed on the lateral side of the projection 33, and may be formed on the entire lateral side of the projection 33. The size of the cutout 331 is not particularly limited as long as the engagement part 214d of the arms 214 is fitted to hamper the movement in the front and back direction of the projection 33, and furthermore, the front sunglass lens member 3 with respect to the arms 214.

The cutout 331 is formed at a position exposed to the outside of the pass-through hole 24 while the projection 33 is inserted in the pass-through hole 24. In the present embodiment, the cutout 331 is formed at a position spaced apart towards the back end side from the mount 34 by greater than or equal to the length of the pass-through hole 24. If the cutout 331 is formed at the relevant position, the cutout 331 can be exposed to the back side of the pass-through hole 24 when the portion on the mount 34 side from the cutout 331 of the projections 33 is inserted to the pass-through hole 24.

Figure 4A:
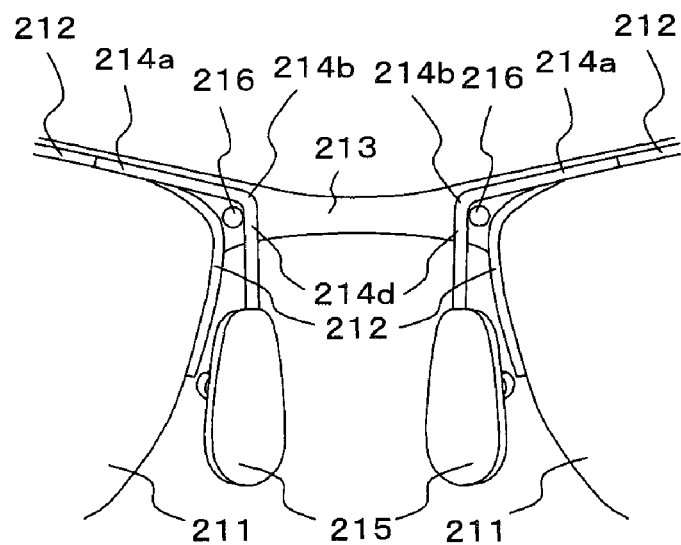
FIG. 4 (FIG. 4A to FIG. 4C) are views describing a method of attaching the front sunglass to a prescription eyeglass according to the first embodiment.
Figure 4B:
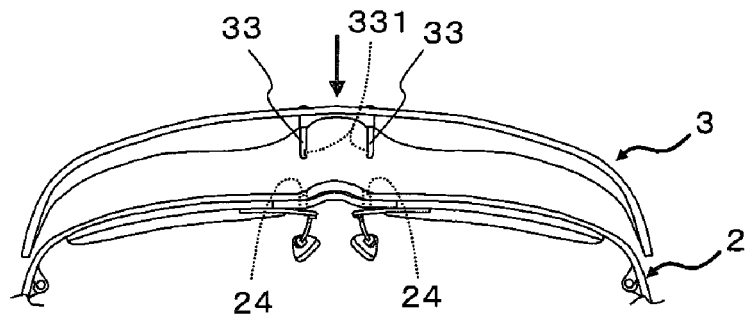
Figure 4C:
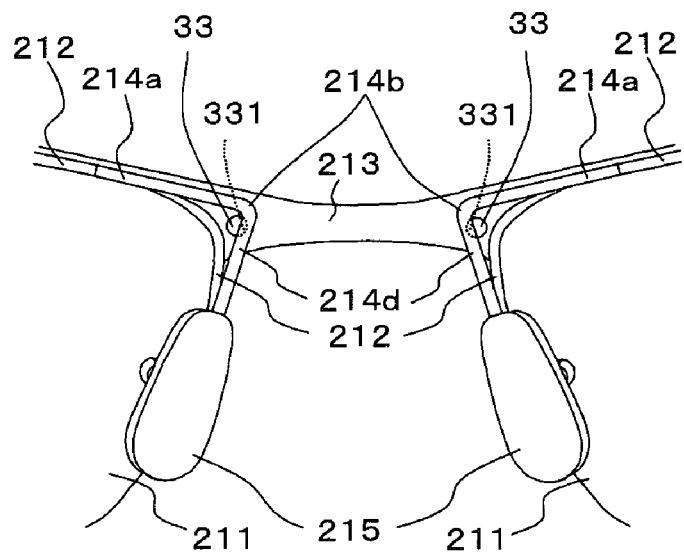

A method of attaching the front sunglass lens member 3 described above to the front surface side of the front frame 21 of the eyeglass 2 will now be described. FIG. 4 (FIG. 4A to FIG. 4C) are views describing the attachment method. First, as shown in FIG. 4A, the engagement parts 214d of the left and right arms 214 or the left and right nose pads 215 are pinched with fingers or the like to move the engagement part 214d of the left arm 214 to the right side of the left pass-through hole 24, and move the engagement part 214d of the right arm 214 to the left side of the right pass-through hole 24. When the engagement parts 214d of the left and right arms 214 are moved, the biasing force for biasing the engagement part 214d towards the left acts on the left arm 214, and the biasing force for biasing the engagement part 214d towards the right acts on the right arm 214.

As shown in FIG. 4B, the front sunglass lens member 3 is slid towards the back surface side at the front side of the prescription eyeglass 2, and the left projection 33 is inserted to the left pass-through hole 24 and the right projection 33 is inserted to the right pass-through hole 24. After the cutouts 331 of the left and right projections 33 are exposed to the back side of the pass-through hole 24, as shown in FIG. 4C, the fingers or the like are released from the engagement parts 214d or the nose pads 215.

When the fingers or the like are released from the engagement parts 214d or the nose pads 215, the engagement part 214d of the left arm 214 elastically engages the cutout 331 of the left projection 33 and the engagement part 214d of the right arm 214 elastically engages the cutout 331 of the right projection 33 due to the biasing force acting on the left and right arms 214. The attachment of the front sunglass lens member 3 is thereby completed.

The front sunglass lens member 3 comes to rest at a position where the biasing force of the left and right arms 214 balances when the left and right arms 214 biased in opposite directions to each other engage the projections 33 in the above manner. The movement in the front and back direction of the front sunglass lens member 3 with respect to the left and right arms 214 is hampered as the engagement parts 214d engage the cutouts 331 of the projections 33.

Therefore, the prescription eyeglass 2 is hidden by the front sunglass lens member 3 (see FIG. 1B) in front view of the eyeglass set 1 by attaching the front sunglass lens member 3 to the front surface side of the front frame 21 of the prescription eyeglass 2. The eyeglass set 1 thus has an outer appearance similar to the sunglass in which the front frame is curved at a large curvature so as to extend along the face in front view by forming the sunglass lens 31 of the front sunglass lens member 3 to a shape curved at a large curvature so as to extend along the face.

The sunglass lens 31 does not have a function of adjusting focus. Thus, the adjustment amount of the focus of the eyeglass set 1 will not change even if the curvature of the front sunglass lens member 3 is changed. The curvature of the front sunglass lens member 3 is thus not restricted by the adjustment amount of the focus. The front sunglass lens member 3 having a shape curved at a large curvature so as to extend along the face thus becomes easy to manufacture.

The sunglass lens 31 is positioned at a front surface side of the prescription lens 211 by attaching the front sunglass lens member 3 to the front surface side of the front frame 21 of the prescription eyeglass 2. When the sunglass lens 31 is positioned at the front surface side of the prescription lens 211, the user of the eyeglass set 1 sees objects through the prescription lens 211 and the sunglass lens 31. Therefore, the eyeglass set 1 can be used as a prescription sunglass having a function of adjusting the focus of the user's eyes by attaching the front sunglass lens member 3 to the front surface side of the front frame 21 of the prescription eyeglass 2.

The eyeglass set 1 thus can be used as a prescription sunglass that is easy to manufacture, has excellent designability, and has a function of adjusting the focus of the user's eyes.

The detachment of the front sunglass lens member 3 from the prescription eyeglass 2 is performed in the following manner. First, the left and right arms 214 are further elastically deformed from the state engaging with the cutouts 331 to disengage the cutouts 331 and the engagement parts 214d. Specifically, the engagement parts 214d of the left and right arms 214 or the left and right nose pads 215 are pinched with fingers or the like to move the engagement part 214d of the left arm 214 to the right side and move the engagement part 214d of the right arm 214 to the left side, thereby releasing the engagement of the cutouts 331 and the engagement parts 214d. The front sunglass lens member 3 is slid towards the front side with respect to the prescription eyeglass 2 until the projections 33 come out of the pass-through holes 24. When the projections 33 come out of the pass-through holes 24, the front sunglass lens 3 is detached from the prescription eyeglass 2.

The front sunglass lens member 3 is removably attached to the prescription eyeglass 2. Thus, the eyeglass set 1 can be used as the prescription sunglass of various designs by preparing a plurality of front sunglass lens members 3 of various designs, and changing the front sunglass lens member 3 to be attached to the prescription eyeglass 2. Therefore, the eyeglass set 1 can be used as the prescription sunglass of a design suited to TPO by changing the front sunglass lens member 3 according to TPO. The attachment and detachment of the front sunglass lens member 3 with respect to the prescription eyeglass 2 are easily performed by the engagement of the cutouts 331 and the engagement parts 214d. Therefore, attachment and detachment of the front sunglass lens member 3 with respect to the prescription eyeglass 2 can be performed by the user of the eyeglass set 1. The eyeglass 1 thus can have a design suited to TPO by changing the front sunglass lens member 3 according to TPO by the user of the eyeglass set 1 himself/herself. Furthermore, the prescription eyeglass 2 can be used as the prescription eyeglass itself if the front sunglass lens member 3 is detached.

The eyeglass set 1 according to present embodiment has the projections 33 inserted to the pass-through holes 24 extending in the front and back direction formed in the prescription eyeglass 2, and thus the movement in the up and down and left and right directions of the projections 33 with respect to the prescription eyeglass 2 is hampered. Therefore, the attachment states of the projections 33, and furthermore, the front sunglass lens member 3 to the prescription eyeglass 2 can be stabilized. Furthermore, the cutouts 331 are formed at positions exposed to the back side of the pass-through holes 24 when the portion on the mount 34 side from the cutouts 331 of the projections 33 is inserted to the pass-through holes 24. The engagement of the engagement parts 214d of arms 214 and the cutouts 331 of the projection 33 is thus not inhibited even if the projections 33 are inserted to the pass-through hole 24. Therefore, the eyeglass set 1 stabilizes the attachment state of the front sunglass lens member 3 to the prescription eyeglass 2 without inhibiting the engagement of arms 214 and the cutouts 331.

Second Embodiment

Figure 5A:
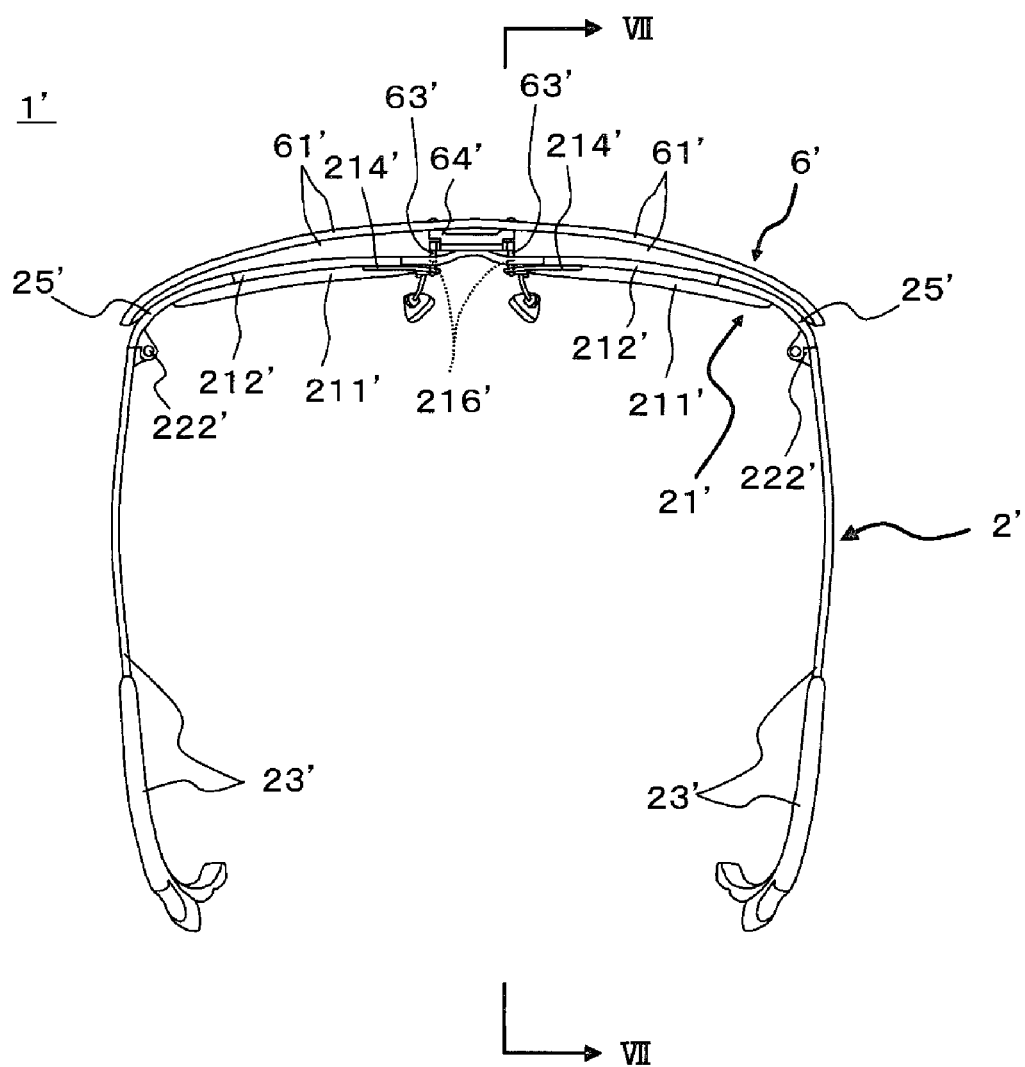
FIG. 5 (FIGS. 5A and 5B) are outer appearance views of an eyeglass set according to a second embodiment.
FIG. 5B is a front view.
Figure 5B:
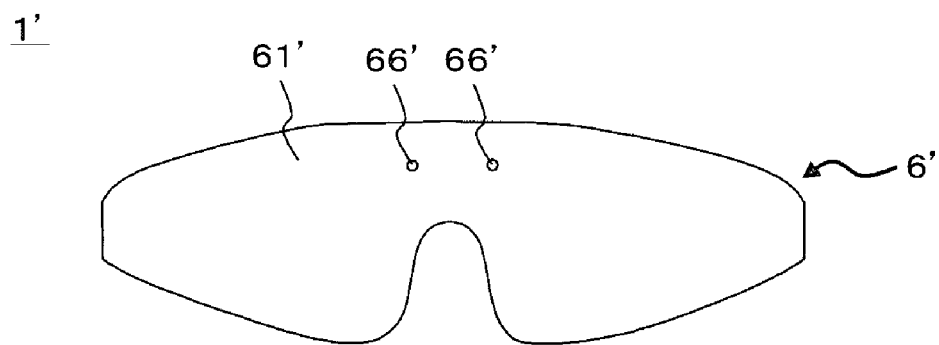

FIG. 5 (FIGS. 5A and 5B) are outer appearance views of an eyeglass set according to a second embodiment. FIG. 5A is a plan view. FIG. 5B is a front view. As shown in FIGS. 5A and 5B, the eyeglass set 1' is equipped with a prescription eyeglass 2' including a front frame 21' with left and right prescription lenses 211' and left and right temples 23', and a front member 6' having a curvature larger than the front frame 21' of the prescription eyeglass 2' and being removably attached to the front surface side of the front frame 21' of the prescription eyeglass 2'. The prescription eyeglass 2' includes wraparound endpieces 25' and hinge structures 222' in addition to the front frame 21' and the temple 23'. The front frame 21' has a configuration same as the front frame 21 of the eyeglass set 1 of the first embodiment.

As shown in FIG. 5A, a pair of left and right wraparound endpieces 25' is arranged. Each left and right wraparound endpieces 25' has a first end attached to a rim part 212' of the front frame 21'.

A pair of left and right hinge structures 222' is arranged. The left hinge structure 222' connects a second end of the left wraparound endpiece 25' and a front end of left temple 23' in a freely pivoting manner. The right hinge structure 222' connects the second end of the right wraparound endpiece 25' and the front end of right temple 23' in a freely pivoting manner.

FIG. 6 (FIG. 6A to FIG. 6D) are outer appearance views of a front member of the second embodiment. FIG. 6A is a rear view. FIG. 6B is a plan view of a central part in a left and right direction. FIG. 6C is a cross sectional view taken along line VI-VI of FIG. 6A. FIG. 6D is a cross sectional view taken along line VI-VI when the sunglass lens of the front member is flipped upward from the state shown in FIG. 6C. As shown in FIG. 6A to FIG. 6D, the front member 6' includes a sunglass lens 61', projections 63', and an attachment part 64'.

The sunglass lens 61' has a configuration same as the sunglass lens 31 of the first embodiment, and the lens same as the sunglass lens 31 can be used as the sunglass lens 61'.

The projection 63' is attached to a coupling strip 65' so as to project towards the back side from a back surface side of the coupling strip 65'. The coupling strip 65' is attached to the sunglass lens 61' by way of the attachment part 64'. Two projections 63' are attached to the coupling strip 65' so as to be arranged side by side on the left and the right. The projection 63' is formed to a substantially circular cylinder shape. The spacing of the projections 63' is the same as the spacing of the pass-through holes 216', and the diameter of the projection 63' is smaller than that of the pass-through hole 216' so that the projections 63' can be inserted to the pass-through holes 216' of the prescription eyeglass 2'. The projection 63' has a cutout 631' formed on the side. The shape and size of the cutout 631' are the same as those of the cutout 331 of the first embodiment. The cutout 631' is formed at a position spaced apart towards the back end side from the coupling strip 65' by greater than or equal to the length of the pass-through hole 216'. When the cutout 631' is formed at the relevant position, the cutout 631' can be exposed to the back side of the pass-through hole 216' when the portion on the coupling strip 65' side from the cutout 631' of the projection 63' is inserted to the pass-through hole 216'.

Figure 6A:
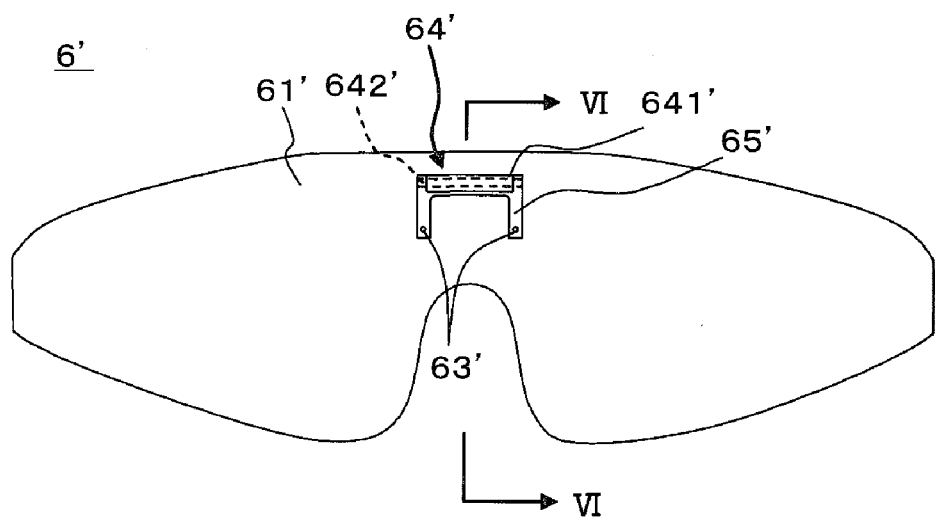
FIG. 6A is a plan view.
Figure 6B:
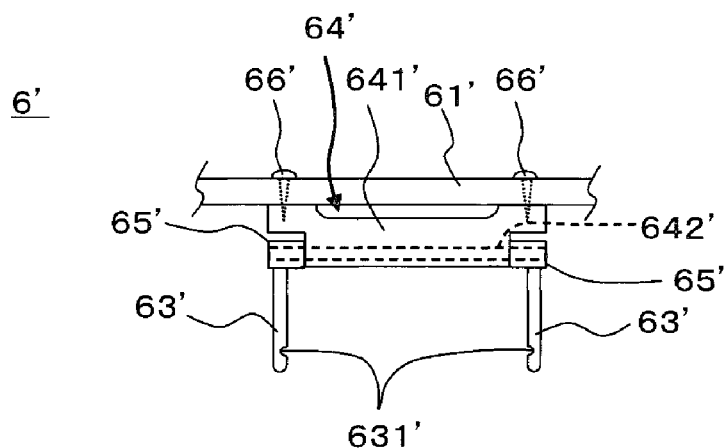
FIG. 6B is a plan view of a central part in a left and right direction.
Figure 6C:
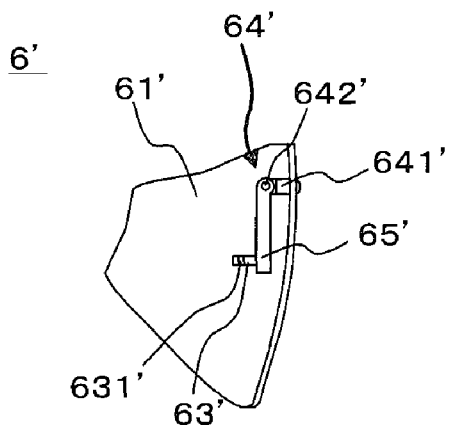
FIG. 6C is a cross sectional view taken along line VI-VI of FIG. 6A.
Figure 6D:
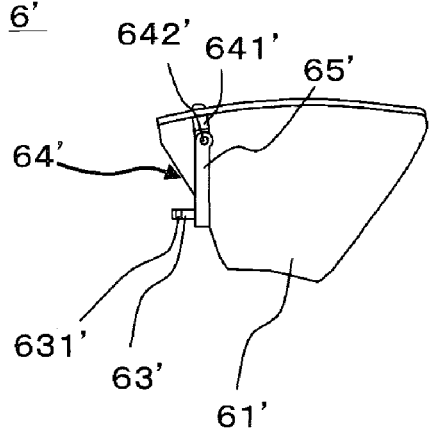
FIG. 6D is a cross sectional view taken along line VI-VI when the sunglass lens of the front member is flipped upward from the state shown in FIG. 6C.

As shown in FIG. 6A, the attachment part 64' is attached to a back surface side at a central part in a left and right direction of the sunglass lens 61'. The attachment is carried out with screws 66', as shown in FIG. 6B. The attachment part 64' includes a fixed strip 641' and a shaft member 642'.

The fixed strip 641' is fixed to the back surface side at the central part in the left and right direction of the sunglass lens 61'. The fixed strip 641' is fixed by screwing the screw 66' into the fixed strip 641'. A pass-through hole (not shown) that passes the fixed strip 641' in the left and right direction is formed in the fixed strip 641'. The shaft member 642' (shown with dotted line in FIGS. 6A and 6B) is inserted to the pass-through hole.

The shaft member 642' is formed to a circular cylinder shape. The shaft member 642' is inserted to the pass-through hole and both ends are exposed on both sides in a left and right direction of the pass-through hole of the fixed strip 641'.

As shown in FIG. 6A, the coupling strip 65' has an H-shape in rear view where an upper part and a lower part are respectively branched into two. The projection 63' is attached so as to project towards the back side at a back surface side of each of the two distal ends formed when branched into two at the lower part of the coupling part 65'. At the upper part, a pass-through hole (not shown) passing through in the left and right direction is formed at each of the two distal ends formed when branched into two. Both ends of the shaft member 642' exposed from the pass-through hole of the fixed strip 641' are inserted to the pass-through holes. Thus, when the shaft member 642' is inserted to the pass-through holes of the fixed strip 641' and the coupling strip 65', the fixed strip 641' and the coupling strip 65' are coupled in a freely pivoting manner.

A specific configuration in which the fixed strip 641' and the coupling strip 65' are coupled in a freely pivoting manner includes the following three configurations. The first configuration is a configuration in which both the fixed strip 641' and the coupling strip 65' are not fixed to the shaft member 642' and are both freely pivotable with respect to the shaft member 642'. The second configuration is a configuration in which the fixed strip 641' is fixed to the shaft member 642', and the coupling strip 65' is not fixed to the shaft member 642'. In the second configuration, the fixed strip 641' and the shaft member 642' are integrally pivotable with respect to the coupling strip 65'. The third configuration is a configuration in which the coupling strip 65' is fixed to the shaft member 642' and the fixed strip 641' is not fixed to the shaft member 642'. In the third configuration, the coupling strip 65' and the shaft member 642' are integrally pivotable with respect to the fixed strip 641'.

If the fixed strip 641' fixed to the sunglass lens 61' is freely pivotable with respect to the coupling strip 65', the sunglass lens 61' can be switched to between a state (see FIG. 6C) of being positioned on a front surface side of the coupling strip 65', and a state (see FIG. 6D) of being flipped upward from the state positioned on the front surface side of the coupling strip 65'.

The attachment of the front member 6' to the front surface side of the front frame 21' of the prescription eyeglass 2' described above is carried out with a method similar to the attachment of the front sunglass lens member 3 to the prescription eyeglass 2 in the eyeglass set 1 of the first embodiment. That is, the projections 63' of the front member 6' are inserted to the pass-through holes 216' of the prescription eyeglass 2' to engage the engagement parts of the arms 214' of the prescription eyeglass 2' to the cutouts 631' of the projections 63'. The detachment of the front member 6' from the prescription eyeglass 2' is carried out with a method similar to the detachment of the front sunglass lens member 3 from the prescription eyeglass 2 in the eyeglass set 1 of the first embodiment. That is, the engagement parts of the arms 214' of the prescription eyeglass 2' and the cutouts 631' of the projections 63' of the front member 6' is disengaged, and the front member 6' is slid towards the front side with respect to the prescription eyeglass 2'.

Figure 7A:
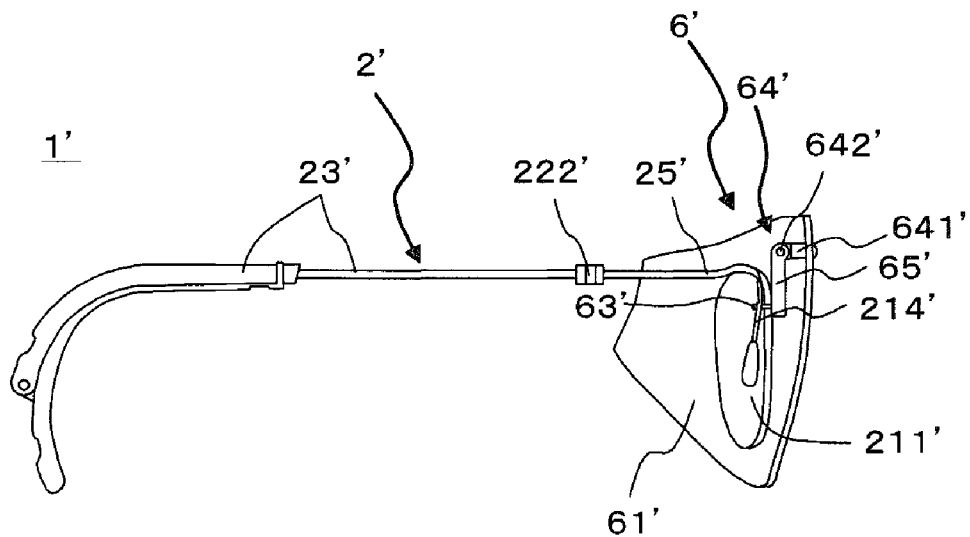
FIG. 7A is a view showing the positional relationship in a state that the sunglass lens is positioned on a front surface side of the front frame of the prescription eyeglass.

As shown in FIG. 7A, when the sunglass lens 61' is positioned on the front surface side of the coupling strip 65' with the front member 6' attached to the front surface side of the front frame 21' of the prescription eyeglass 2', the sunglass 61' will be positioned on the front surface side of the prescription lens 211' of the prescription eyeglass 2'. When the sunglass lens 61' is positioned on the front surface side of the prescription lens 211', the user of the eyeglass set 1' sees objects through the prescription lens 211' and the sunglass lens 61'. Therefore, when the sunglass lens 61' is positioned on the front surface side of the front frame 21' of the prescription eyeglass 2', the eyeglass set 1' can be used as a prescription sunglass having a function of adjusting the focus of the user's eyes. When the sunglass lens 61' is positioned on the front surface side of the front frame 21' of the prescription eyeglass 2', the prescription eyeglass 2' is hidden by the sunglass lens 61' (see FIG. 5B) in front view of the eyeglass set 1'. Since the sunglass lens 61' does not have the focus adjusting function, the front member 6 curved at a large curvature so as to extend along the face becomes easy to manufacture. Therefore, the eyeglass set 1' can be used as a prescription sunglass that is also easy to manufacture, has excellent designability, and has an adjusting function of the user's eyes, similar to the eyeglass set 1 of the first embodiment.

Figure 7B:
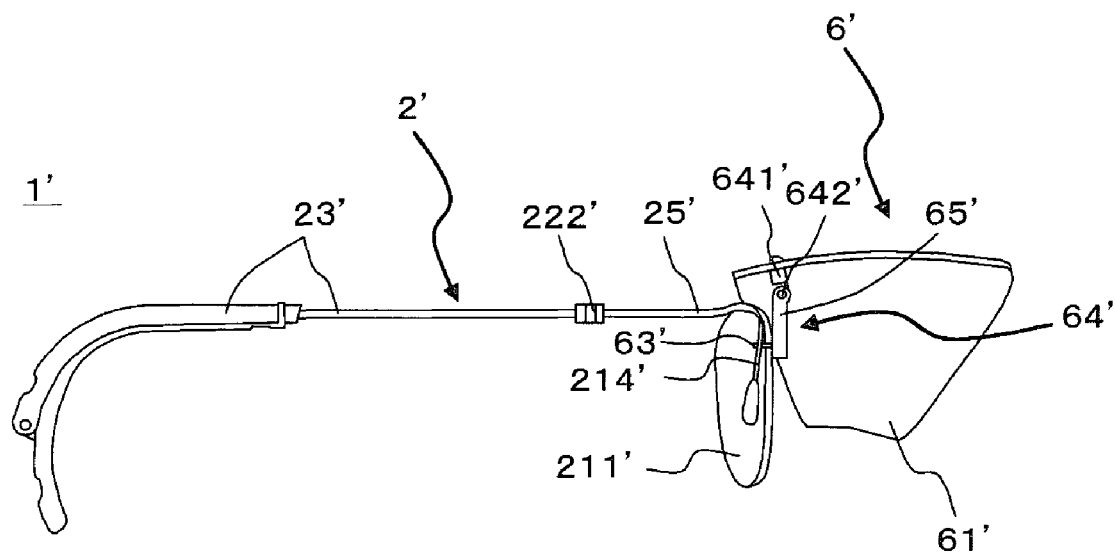
FIG. 7B is a view showing the positional relationship in a state that the sunglass lens is flipped upward.

As shown in FIG. 7B, when the sunglass 61' is flipped upward with the front member 6' attached to the front surface side of the front frame 21' of the prescription eyeglass 2', the sunglass lens 61' moves to the upper side of the prescription lens 211' of the prescription eyeglass 2'. Therefore, when the sunglass lens 61' is flipped upward, the user of the eyeglass set 1' sees objects only through the prescription lens 211' of the prescription eyeglass 2'. Therefore, according to the eyeglass set 1', if the sunglass lens 61' is flipped upward when entering a dark place such as tunnel, the view in the dark place is prevented from degrading while maintaining the function of adjusting the focus of the user's eyes. Therefore, the eyeglass set 1' prevents the view from degrading without taking off the sunglass lens 61' by flipping the sunglass lens 61' upward. Therefore, the eyeglass 1' can be used as a user friendly prescription sunglass that is easy to manufacture, has excellent designability, and has a function of adjusting the focus of the user's eyes.

The front member 6' of the eyeglass set 1' is removably attached to the prescription eyeglass 2'. Thus, the eyeglass set 1' can be used as the prescription sunglass of various designs by preparing a plurality of front members 6' of various designs, and changing the front member 6' to be attached to the prescription eyeglass 2'. Therefore, the eyeglass set 1' can be used as a prescription sunglass of a design suited to TPO by changing the front member 6' according to TPO. The prescription eyeglass 2' of the eyeglass set 1' can be used as the prescription eyeglass itself if the front member 6' is detached from the prescription eyeglass 2'.

Third Embodiment

Figure 8:
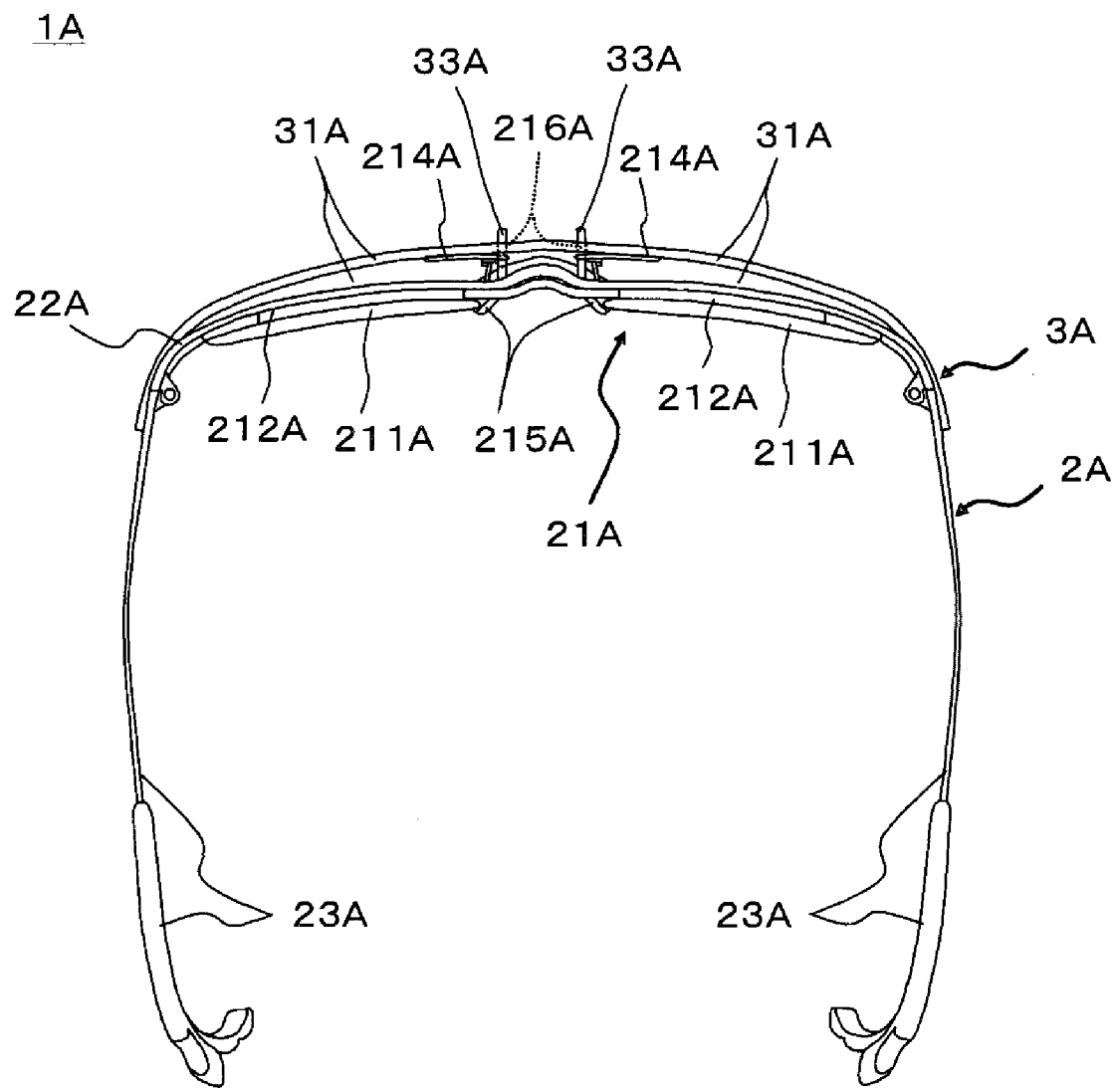
FIG. 8 is a plan view of an eyeglass set according to a third embodiment.

FIG. 8 is a plan view of an eyeglass set 1A according to the present embodiment. The eyeglass set 1A according to the present embodiment differs from the eyeglass set 1 of the first embodiment in that projections 33A are arranged on a prescription eyeglass 2A, and the arms 214A, the nose pads 215A, and pass-through holes 216A are arranged on the front sunglass lens member 3A.

Figure 9A:
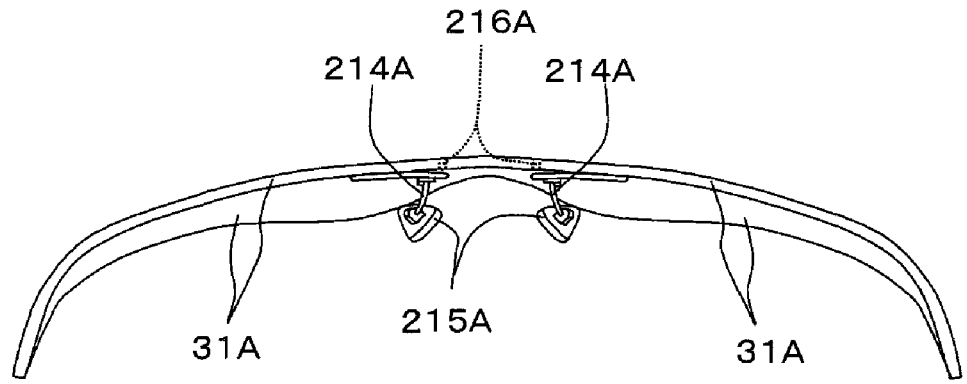
FIG. 9A is a plan view.
Figure 9B:
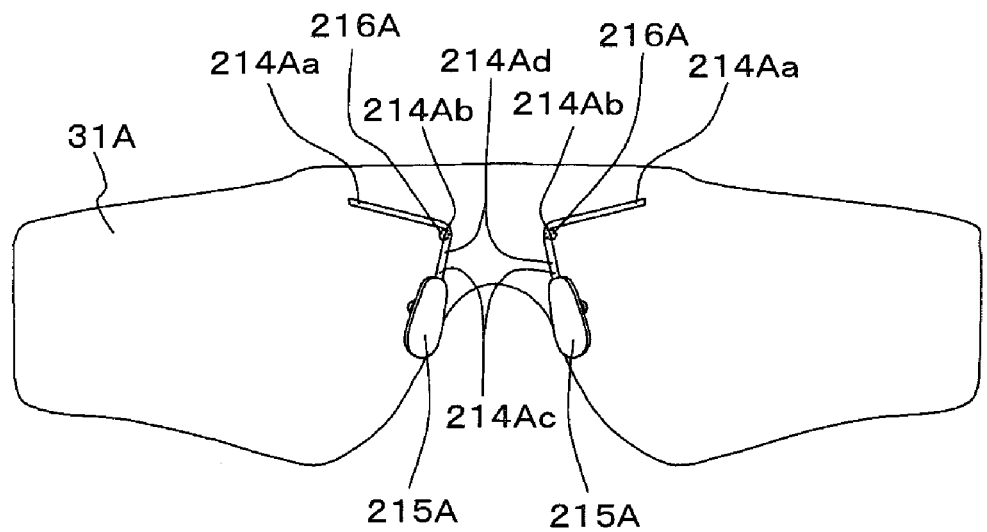
FIG. 9B is a front view.

FIG. 9 (FIGS. 9A and 9B) are outer appearance views of a front sunglass lens member of an eyeglass set according to a third embodiment. FIG. 9A is a plan view. FIG. 9B is a front view. As shown in FIGS. 9A and 9 B, the front sunglass lens member 3A includes a sunglass lens 31A, left and right arms 214A, nose pads 215A, and pass-through holes 216A. The sunglass lens 31A has a configuration same as the sunglass lens 31 of the first embodiment, and the lens same as the sunglass lens 31 can be used as the sunglass lens 31A.

As shown in FIG. 9B, the left and right arms 214A are formed to a substantially L-shape in which an intermediate part 214Ab is bent, similar to the first embodiment. The left and right arms 214A have the basal ends 214Aa attached to a back surface side of the sunglass lens 31A. The positions at where the basal ends 214Aa of the left and right arms 214A are attached are a central part in a left and right direction of the back surface side of the sunglass lens 31A. This is so that the arms 214A are less likely to come into the view of the user of the eyeglass set 1A. A positional relationship of the basal end 214Aa, the intermediate part 214Ab, and the distal end 214Ac in the left and right arms 214A is the same as the first embodiment. The left and right arms 214A have elasticity, similar to the left and right arms 214 of the first embodiment.

The pass-through hole 216A is a hole for passing the sunglass lens 31A in the front and back direction. The pass-through hole 216 is formed at two locations at the central part in the left and right direction of the sunglass lens 31A. As shown in FIG. 9B, the left pass-through hole 216A is formed on the front surface side of the engagement part 214Ad of the left arm 214A in a non-elastically deformed state. Similarly, the right pass-through hole 216A is formed on the front surface side of the engagement part 214Ad of the right arm 214A in a non-elastically deformed state.

Figure 10:
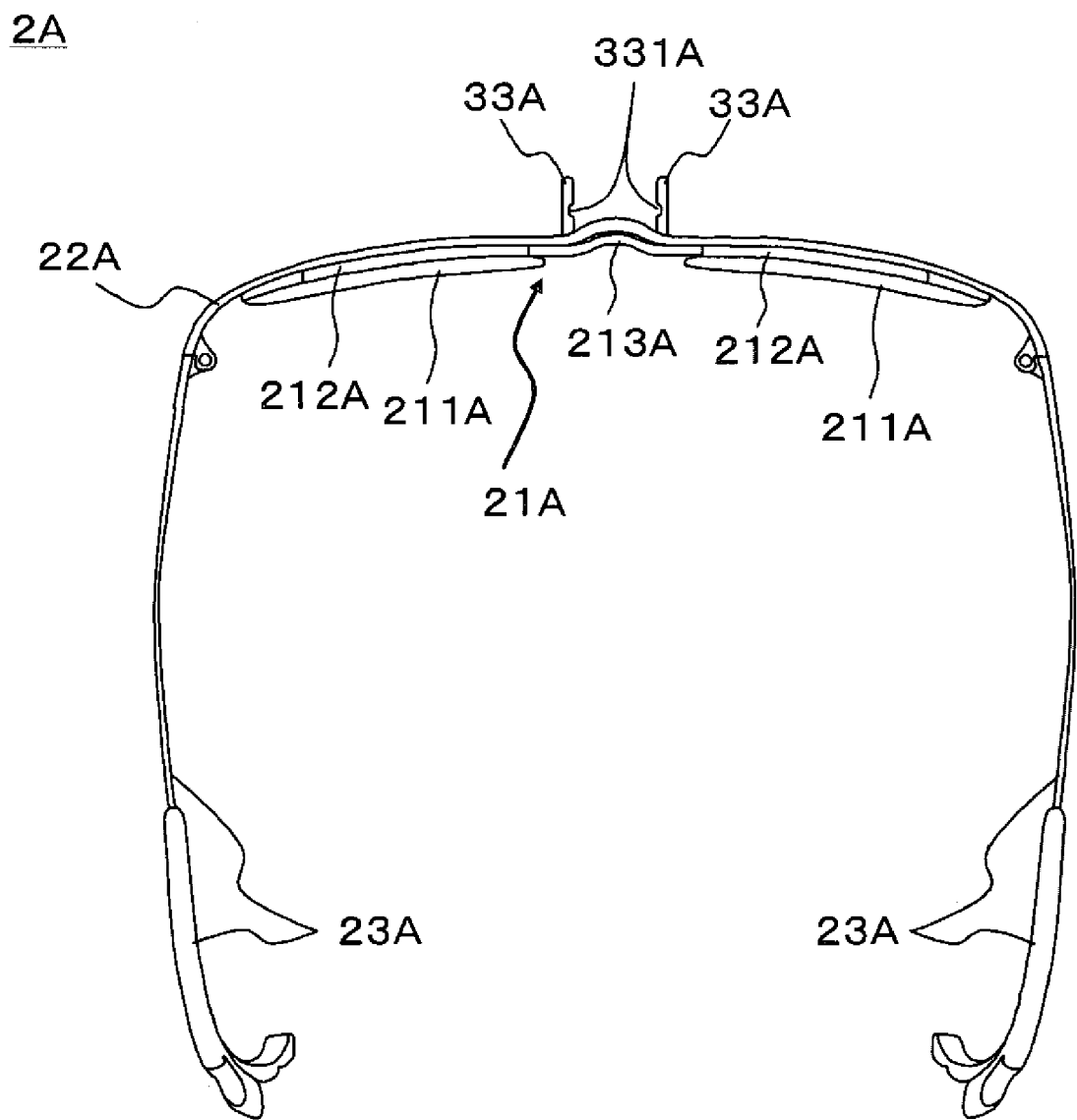
FIG. 10 is a plan view of a prescription eyeglass of the third embodiment.

FIG. 10 is a plan view of the prescription eyeglass 2A. As shown in FIG. 10, the prescription eyeglass 2A includes a front frame 21A, an elongate member 22A, and temples 23A, similar to the prescription eyeglass 2 of the first embodiment.

The front frame 21A includes left and right prescription lenses 211A, rim parts 212A, and a bridge part 213A. The front frame 21A differs from the front frame 21 of the first embodiment in that the arms, the nose pads, and the pass-through hole are not arranged. The elongate member 22A differs from the elongate member 22 of the first embodiment in that the pass-through holes are not formed and the projections 33A are arranged. The temples 23A have a configuration same as the temples 23 of the first embodiment.

The projection 33A is formed to project towards the front side from a front surface side at a central part in a left and right direction of the elongate member 22A. Two projections 33A are formed so as to be arranged side by side on the left and the right. Each projection 33A is formed to a substantially circular cylinder shape. The spacing of the projections 33A and the spacing of the pass-through holes 216A are the same, and the diameter of the projection 33A is smaller than that of the pass-through hole 216A so that the projection 33A can be inserted to the pass-trough hole 216A.

The projection 33A has a cutout 331A formed on the lateral side. In the present embodiment, the cutout 331A is formed on the side at the central side of the elongate member 22A. The cutout 331A is formed at a position spaced apart towards the back end (elongate member 22A) side from the front end of the projection 33A by greater than or equal to the length of pass-through hole 216A so as to be exposed outside the pass-through hole 216A while the projection 33A is inserted in the pass-through hole 216A. When the cutout 331A is formed at such position, the portion on the front end side from the cutout 331A of the projection 33A is inserted to the pass-through hole 216A and the cutout 331A is exposed to the back side of the pass-through hole 216A.

A method of attaching the front sunglass 3A described above to a front surface side of the front frame 21A of the prescription eyeglass 2A will now be described. Similar to the first embodiment, the engagement parts 214Ad of the left and right arms 214A or the left and right nose pads 215A of the front sunglass lens member 3A are pinched with fingers or the like to move the engagement part 214Ad of the left arm 214A to the right side of the left pass-through hole 216A and move the engagement part 214Ad of the right arm 214A to the left side of the right pass-through hole 216A. Then, the front sunglass lens member 3A is slid towards the back side at the front surface side of the prescription eyeglass 2A, and the left projection 33A is inserted to the left pass-through hole 216A and the right projection 33A is inserted to the right pass-through hole 216A. After the front ends of the left and right projections 33A are exposed to the front side of the pass-through holes 216A, the fingers or the like are released from the engagement parts 214Ad or the nose pads 215A, so that the engagement parts 214Ad engage the cutouts 331A of the projections 33a. As shown in FIG. 8, the front sunglass lens member 3A is thereby attached to a front surface side of the prescription eyeglass 2a.

Therefore, since the front sunglass lens member 3A can be attached to the front surface side of the front frame 21A of the prescription eyeglass 2A, the eyeglass set 1A can be used as a prescription sunglass that is easy to manufacture, has excellent designability, and has a function of adjusting the focus of the user's eyes, similar to the eyeglass set 1 according to the first embodiment.

The detachment of the front sunglass lens member 3A from the prescription eyeglass 2A can be carried out by disengaging the cutouts 331A and the engagement parts 214Ad, and sliding the front sunglass lens member 3A towards the front side so that the projections 33A come out of the pass-through holes 216A, similar to the first embodiment.

Therefore, the front sunglass lens member 3A can be removably attached to the prescription eyeglass 2A. Therefore, the eyeglass set 1A can be used as prescription sunglass of various designs by preparing a plurality of front sunglass lens members 3A of various designs, and changing the front sunglass lens member 3A to be attached to the prescription eyeglass 2A. Therefore, the eyeglass set 1A can be used as the prescription sunglass of a design suited to TPO by changing the front sunglass lens member 3A according to TPO. Furthermore, the prescription eyeglass 2A can be used as the prescription eyeglass itself if the front sunglass lens member 3A is detached.

Fourth Embodiment

Figure 11A:
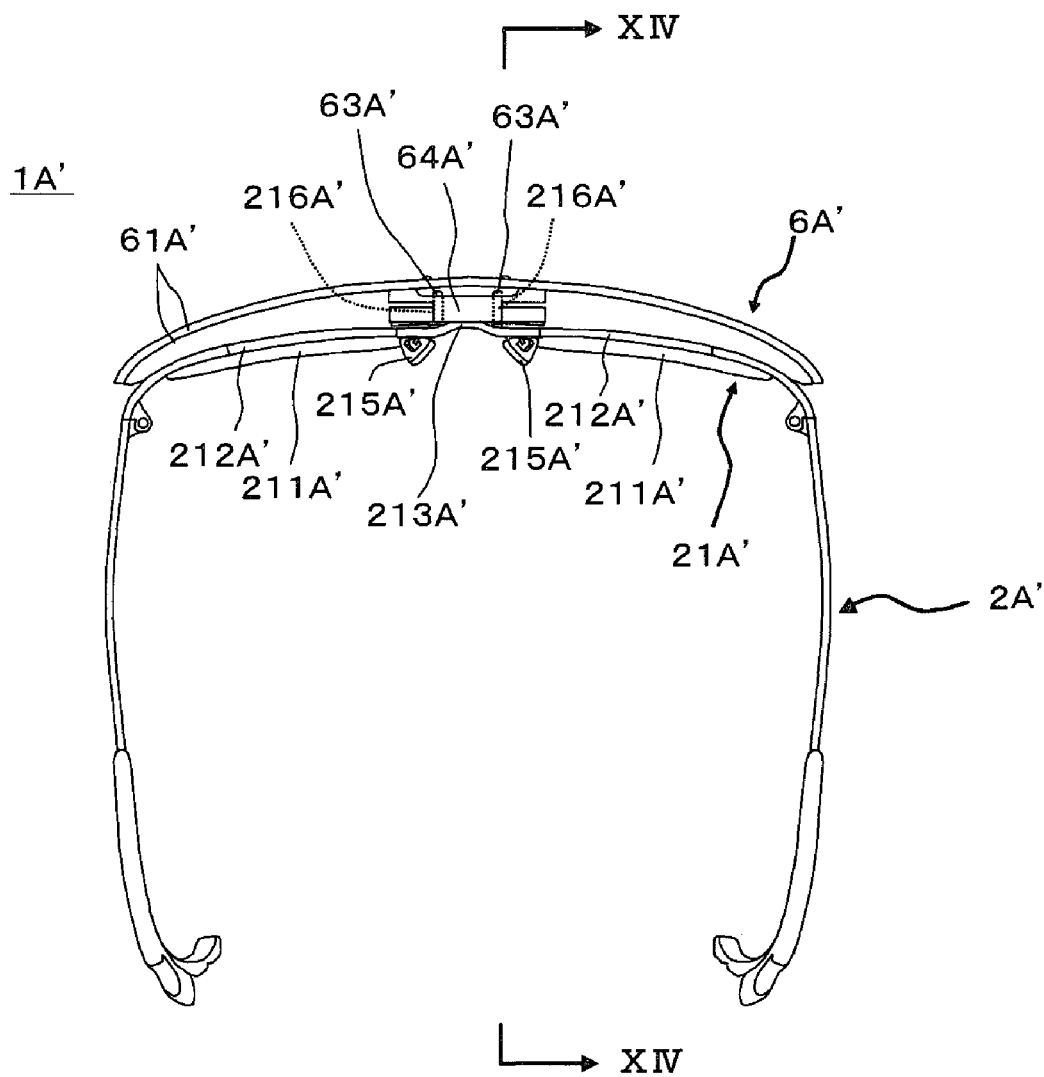
FIG. 11A is a plan view.
Figure 11B:
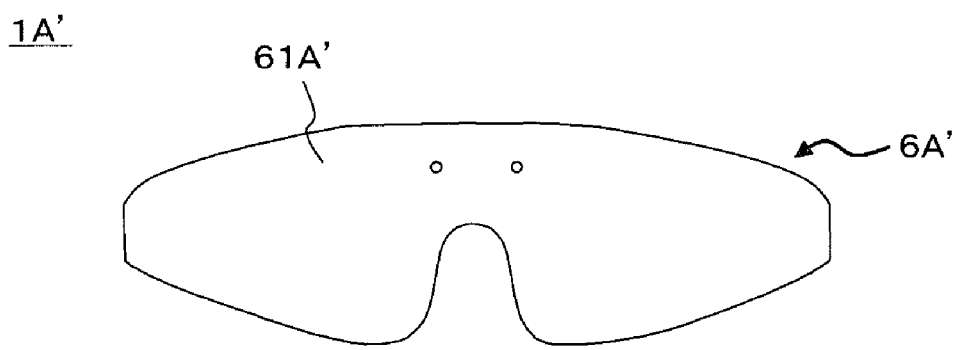
FIG. 11B is a front view.

FIG. 11 (FIGS. 11A and 11B) are outer appearance views of an eyeglass set according to a fourth embodiment. FIG. 11A is a plan view. FIG. 11B is a front view. As shown in FIGS. 11A and 11B, the eyeglass set 1A is equipped with a prescription eyeglass 2A' and a front member 6A' removably attached to a front surface side of the front frame 21A of the prescription eyeglass 2A. The eyeglass set 1A' differs from the prescription set 1' of the second embodiment in that the projections 63A' are arranged on the prescription eyeglass 2A', and the arms, the nose pads 215A, and the pass-through holes 216A' are arranged on the front member 6'.

Figure 12:
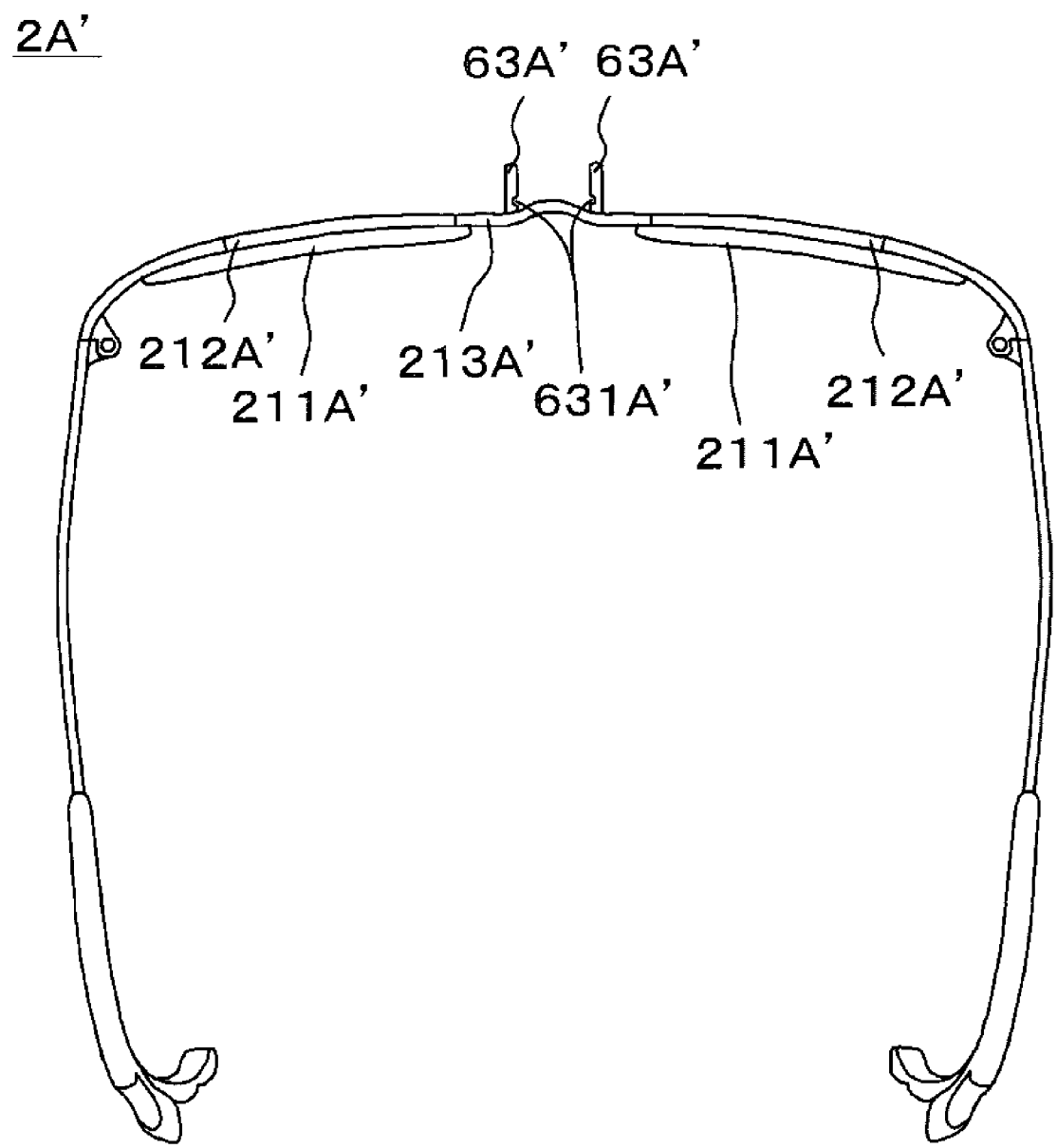
FIG. 12 is a plan view of a prescription eyeglass of the fourth embodiment.

FIG. 12 is a plan view of the prescription eyeglass 2A'. The prescription eyeglass 2A includes left and right prescription lenses 211A', a rim part 212A', and a bridge part 213A', as shown in FIG. 12. The projections 63A' are formed at the bridge part 213A'.

The projection 63A' is formed to project towards the front side from a front surface side at a central part in a left and right direction of the bridge part 213A'. Two projections 63A' are formed arranged side by side on the left and the right. Each projection 63A' is formed into a substantially circular cylinder shape. The spacing of the projections 63A' and the spacing of the pass-through holes 216A' are the same and the diameter of the projection 63A' is smaller than the pass-through hole 216A' so that the projection 63A' can be inserted to the pass-through hole 216A'.

The projection 63A' has a cutout 631A" formed on the lateral side. In the present embodiment, the cutout 631A' is formed on the side at the central side in the left and right direction of the bridge part 213A". The cutout 631A" is formed at a position spaced apart towards the back end side (bridge part 213A) from a front end of the projection 63A' by greater than or equal to the length of the pass-through hole 216A' so as to be exposed on the outside of the pass-through hole 216A' while the projection 63A' is inserted into the pass-through hole 216A'. When the cutout 631A' is formed at such position, the position on the front end side from the cutout 631A' of the projection 63A' is inserted to the pass-through hole 216A', and the cutout 631A' is exposed to the back surface side of the pass-through hole 216A'.

FIG. 13 (FIG. 13A to FIG. 13D) are outer appearance views of a front member of the fourth embodiment. FIG. 13A is a rear view. FIG. 13B is a plan view of a central part in a left and right direction. FIG. 13C is a cross sectional view taken along line XIII-XIII of FIG. 13A. FIG. 13D is a cross sectional view taken along line XIII-XIII when the sunglass lens of the front member is flipped upward from the state shown in FIG. 13C.

As shown in FIG. 13A to FIG. 13D, the left and right arms 214A are attached to a back surface side of the coupling strip 65A' of the front member 6A' through brazing and the like. As described in the second embodiment, the coupling strip 65A is connected to the fixed strip 641A' in a freely pivoting manner. The fixed strip 641A' is fixed to the sunglass lens 61A'. Therefore, the sunglass lens 61A can be switched to between a state (see FIG. 13C) of being positioned on a front surface side of the coupling strip 65A' and the arms 214A", and a state (see FIG. 13D) of being flipped upward from the state positioned on the front surface side of the coupling strip 65A and the arms 214A'.

The nose pad 215A' is attached to each distal end 214Ac' of the left and right arms 214A'.

Figure 13A:
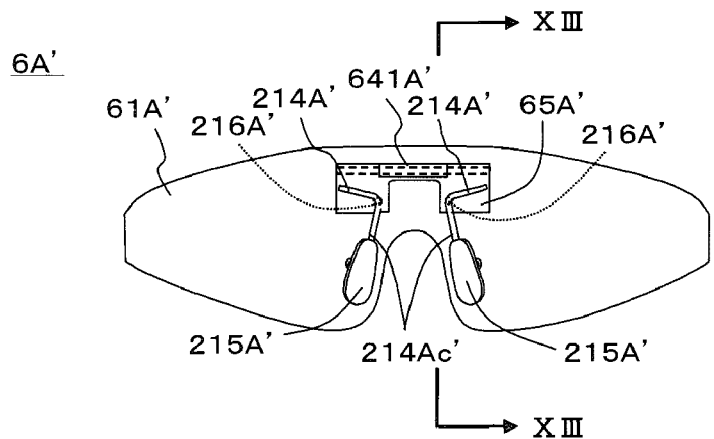
FIG. 13A is a rear view.
Figure 13B:
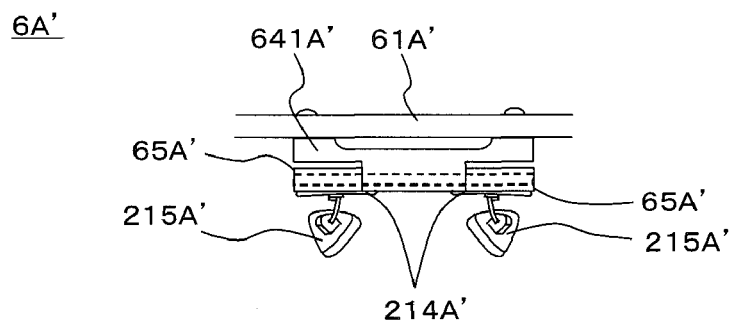
FIG. 13B is a plan view of a central part in a left and right direction.
Figure 13C:
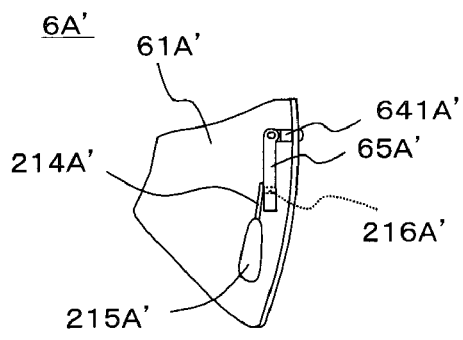
FIG. 13C is a cross sectional view taken along line XIII-XIII of FIG. 13A.
Figure 13D:
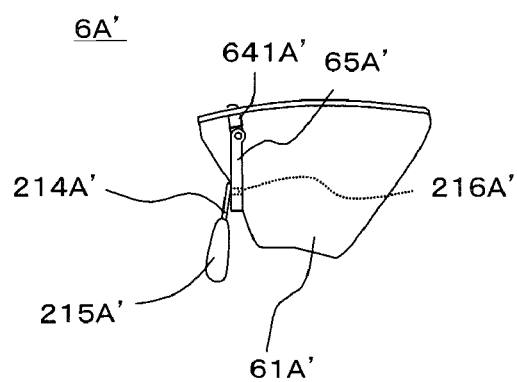
FIG. 13D is a cross sectional view taken along line XIII-XIII when the sunglass lens of the front member is flipped upward from the state shown in FIG. 13C.

The pass-through hole 216A' is formed in the coupling strip 65A'. The relevant pass-through hole 216A' is a hole for passing the coupling strip 65A' in the front and back direction. As shown in FIG. 13A, the pass-through hole 216A' is formed on the front surface side of the arms 214A' in a non-elastically deformed state.

The attachment of the front member 6A' to the front surface side of the front frame 21A' of the prescription eyeglass 2A' described above is carried out with a method similar to the method described in the second embodiment other than that the projection 63A' is inserted to the pass-through hole 216A from the back side (front side in the second embodiment). The detachment of the front member 6A from the prescription eyeglass 2A' is also carried out with a method similar to the method described in the second embodiment other than that the projection 63A' is slid towards the back side (front in the second embodiment) with respect to the prescription eyeglass 2A.

Figure 14A:
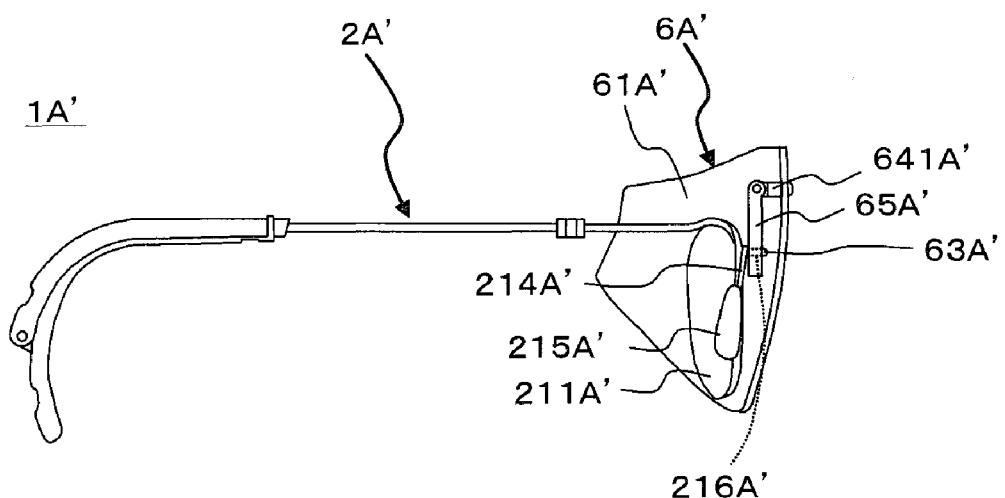
FIG. 14A is a view showing the positional relationship in a state that the sunglass lens is positioned on a front surface side of the front frame of the prescription eyeglass.

As shown in FIG. 14A, the sunglass lens 61A' is positioned on a front surface side of the prescription lens 211A' of the prescription eyeglass 2A when the sunglass lens 61A' is positioned on the front surface side of the coupling strip 65A" and the arms 214A" with the front member 6A' attached to the front surface side of the front frame 21A' of the prescription eyeglass 2A'. The user of the eyeglass set 1A' sees objects through the prescription lens 211A' and the sunglass lens 61A' when the sunglass lens 61A' is positioned on the front surface side of the prescription lens 211A'. Therefore, when the sunglass lens 61A' is positioned on the front surface of the front frame 21A of the prescription eyeglass 2A', the eyeglass set 1A' can be used as the prescription sunglass having a function of adjusting the focus of the user's eyes. The prescription eyeglass 2A' is hidden by the sunglass lens 61A' in front view of the eyeglass set 1A' when the sunglass lens 61A' is positioned on the front surface side of the front frame 21A' of the prescription eyeglass 2A'. The front member 6A' curved at a large curvature so as to extend along the face can be easily manufactured since the sunglass lens 61A' does not have the focus adjusting function. The eyeglass set 1A' thus can be used as a prescription sunglass that is easy to manufacture, has excellent designability, and has a function of adjusting the focus of the user's eyes.

Figure 14B:
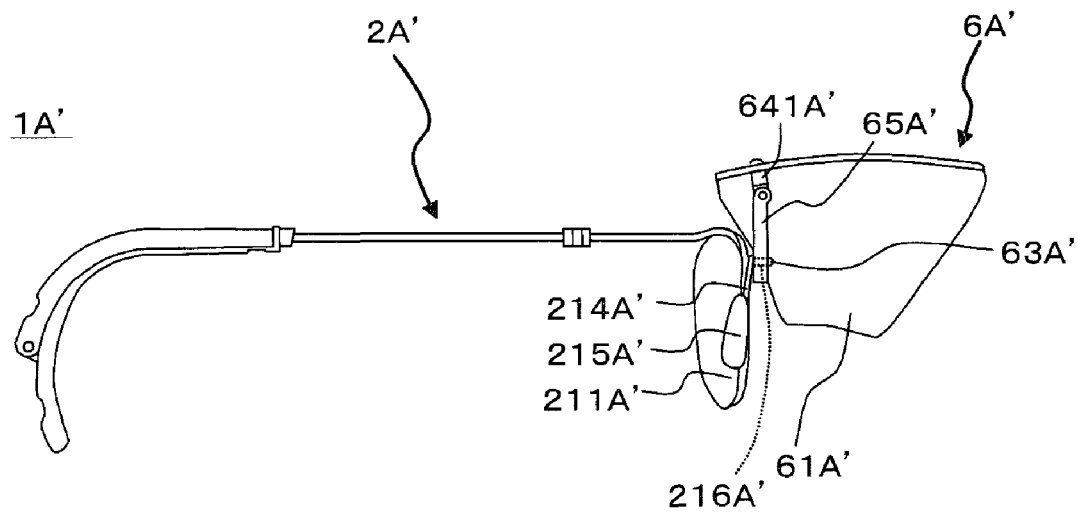
FIG. 14B is a view showing the positional relationship in a state that the sunglass lens is flipped upward.

As shown in FIG. 14B, when the sunglass lens 61A' is flipped upward with the front member 6A attached to the front surface side of the front frame 21A' of the prescription eyeglass 2A', the sunglass lens 61A' is moved to the upper side of the prescription lens 211A' of the prescription eyeglass 2A. Therefore, when the sunglass lens 61A' is flipped upward, the user of the eyeglass set 1A' can see objects through only the prescription lens 211A' of the prescription eyeglass 2A'. According to the eyeglass set 1A', the view is prevented from degrading by flipping the sunglass lens 61A' upward without taking off the sunglass lens 61A' when entering a dark place, similar to the eyeglass set 1' of the second embodiment. Therefore, the eyeglass set 1A' can be used as a user friendly prescription sunglass that is easy to manufacture, has excellent designability, and has a function of adjusting the focus of the user's eyes.

The front member 6A' of the eyeglass set 1A' is removably attached to the prescription eyeglass 2A'. Therefore, the eyeglass set 1A' can be used as a prescription sunglass of various designs by preparing a plurality of front members 6A' of various designs, and changing the front member 6A' to be attached to the prescription eyeglass 2A'. The eyeglass set 1A' thus can be used as a prescription sunglass of a design suited to TPO by changing the front member 6A' according to TPO. Furthermore, the prescription eyeglass 2A' of the eyeglass set 1A' can be used as the prescription eyeglass itself if the front member 6A' is detached from the prescription eyeglass 2A'.

Figure 15A:
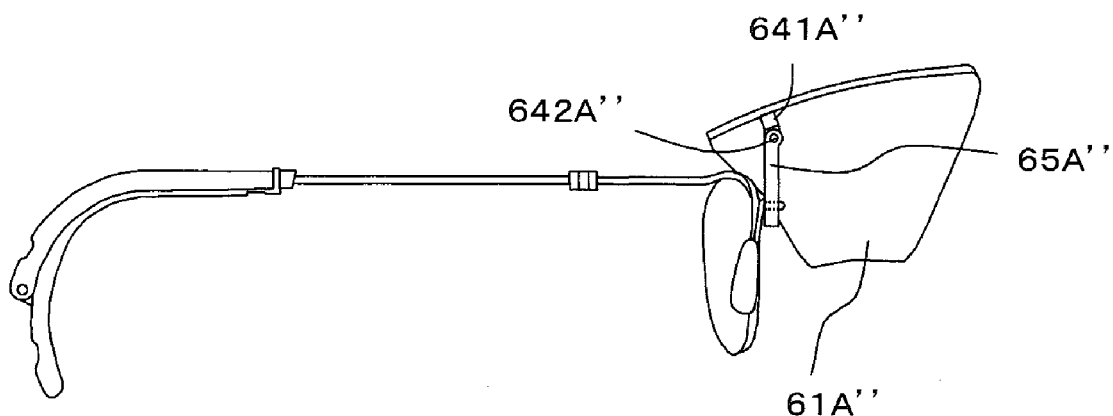
FIG. 15A is an explanatory view of a third state of the sunglass lens.
Figure 15B:
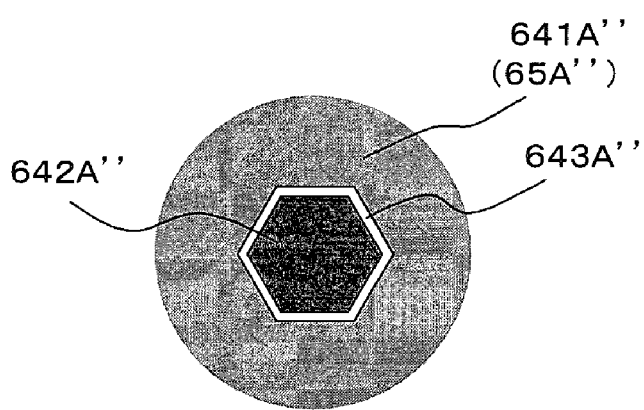
FIG. 15B is a view describing a specific configuration where the sunglass lens can be switched to three states.

As shown in FIGS. 7 and 14, the sunglass lens can be switched to two states in the eyeglass set of the second and fourth embodiments. However, the sunglass may also be switched to the following three states. As shown in FIGS. 7A and 14A, a first state is a state of being positioned on the front surface side of the front frame 21', 21A of the prescription eyeglass 2', 2A'. As shown in FIGS. 7B and 14B, a second state is a state in which the sunglass lens 61', 61A is flipped upward from the first state, the sunglass lens 61', 61A' being extended towards the front side in a horizontal direction. FIG. 15 (FIGS. 15A and 15B) are views describing the configuration in which the sunglass lens can be switched among the three states. As shown in FIG. 15A, a third state is a state in which the sunglass lens 61" is flipped upward from the first state, the sunglass lens 61" being further pivoted from the second state so as to be directed diagonally upward.

In the first state, the user of the eyeglass set can see objects through the prescription lens and the sunglass lens, and the eyeglass set can be used as the prescription eyeglass, as described in the second and fourth embodiments. In the second state and the third state, the user of the eyeglass set can see objects through only the prescription lens. Since the sunglass lens is extended towards the front side in the horizontal direction in the second state, the light from above such as sun light is shielded by the sunglass lens, and the user of the eyeglass set is prevented from glare. Since the sunglass lens is directed diagonally upward in the third state, the sunglass lens is less likely to enter the view of the user of the eyeglass set compared to the second state, and thus objects are seen only through the prescription lens, and a wide view is ensured.

A specific configuration for switching among three states described above includes the following configuration shown in FIG. 15B. The relevant configuration is a configuration in which the pass-through hole 643" formed in the fixed strip 641" and the coupled strip 65" to which the shaft member 642" is inserted has a hexagonal cross section, and the shaft member 642" inserted to the pass-through holes 643" has flexibility and has a rectangular column shape of a hexagonal cross section slightly smaller than that of the pass-through hole 643". In such configuration, the pivot of the fixed strip 641" and the coupled strip 65" with respect to the shaft member 642" becomes possible as the corners of the shaft member 642" are pressed and deformed by the fixed strip 641" and the coupled strip 65" while pivoting. Furthermore, the pivot of the fixed strip 641" and the coupled strip 65" with respect to the shaft member 642" requires the shaft member 642" to deform. When force is not applied to the eyeglass set to switch the state of the sunglass lens 61", the state of the sunglass lens 61" is not switched and thus the state of the sunglass lens 6" is maintained.

Fifth Embodiment

Figure 16A:
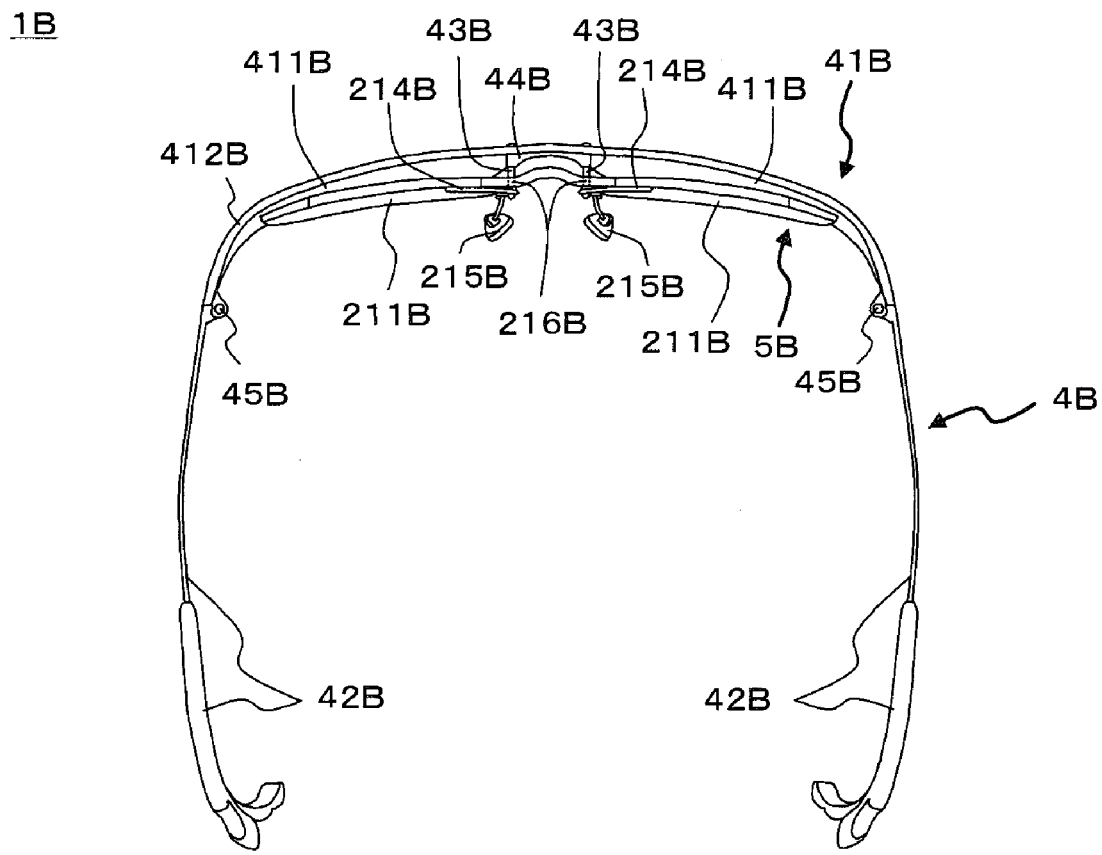
FIG. 16A is a plan view.
Figure 16B:
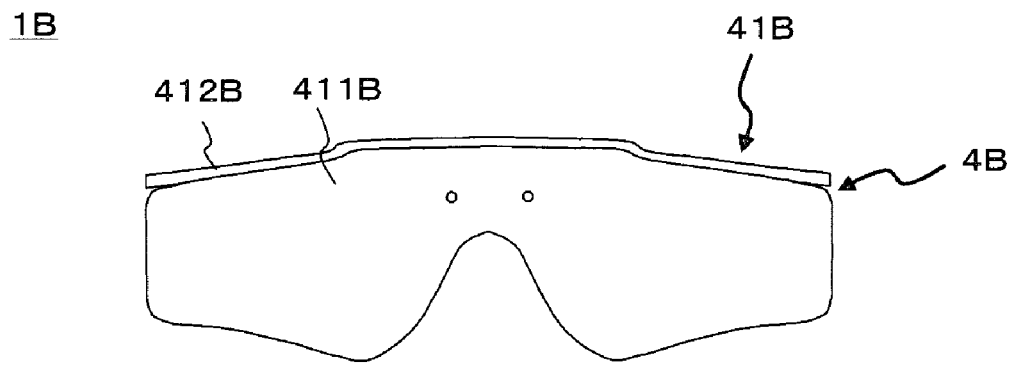
FIG. 16B is a front view.

FIG. 16 (FIGS. 16A and 16B) are outer appearance views of an eyeglass set according to a fifth embodiment. FIG. 16A is a plan view. FIG. 16B is a front view. As shown in FIG. 16, the eyeglass set 1B is equipped with a sunglass 4B including a front frame 41B with a sunglass lens 411B, and an inner eyeglass 5B including left and right prescription lenses 211B. The eyeglass 5B is removably attached to a back surface of the front frame 41B of the sunglass 4B.

The sunglass 4B includes left and right temples 42B, projections 43B, and hinge structures 45B in addition to the front frame 41B.

Figure 17:
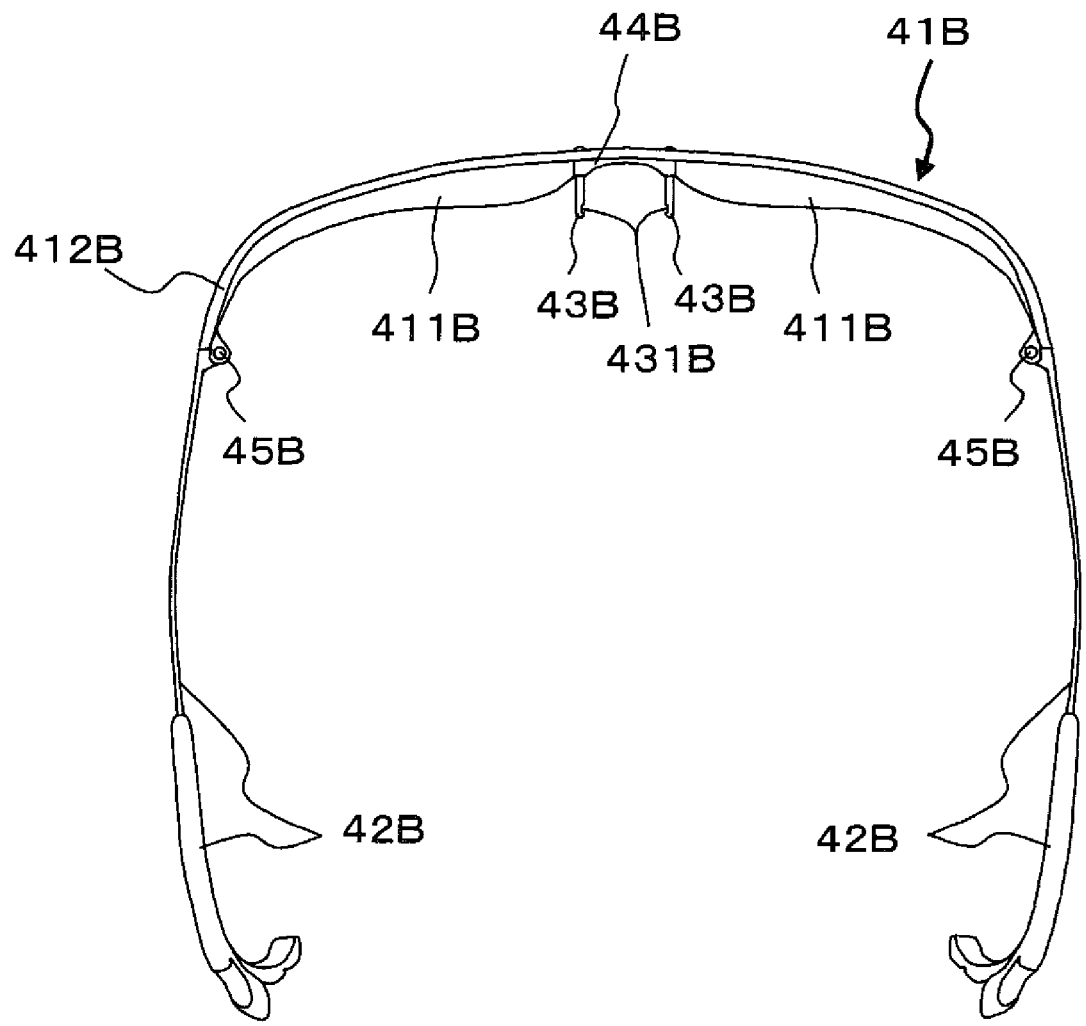
FIG. 17 is a plan view of a sunglass of the fifth embodiment.

FIG. 17 is a plan view of the sunglass 4B. As shown in FIG. 17, the front frame 41B includes a rim part 412B in addition to the sunglass lens 411B. The sunglass lens 411B has a configuration same as the sunglass lens 31 of the first embodiment, and the lens same lens as the sunglass lens 31 as the sunglass lens 411B.

As shown in FIG. 16B, the rim part 412B is arranged along the upper end of the sunglass lens 411B.

The hinge structure 45B is arranged on both ends in a left and right direction of the rim part 412B. The hinge structure 45B is connected to a front end of the temple 42B. The left and right temples 42B are connected to the front frame 41B in a freely pivoting manner by the hinge structure 45B.

As shown in FIG. 17, the projections 43B are attached to the sunglass lens 411B by way of a mount 44B. The mount 44B is attached to a back surface side at a central part in a left and right direction of the sunglass lens 41B. The mount 44B has a configuration same as the mount 34 of the first embodiment. The projections 43B are attached to the mount 44B so as to project towards the back side from a back surface side of the mount 44B. In the present embodiment, two projections 43B are attached to the mount 44B so as to be arranged side by side on the left and the right. The configuration of the projection 43B is the same as that of the projection 33 of the first embodiment.

The projection 43B has a cutout 431B formed on the lateral side. The shape, position to be formed, and the size of the cutout 431B are the same as those of the cutout 331 of the first embodiment.

The inner eyeglass 5B has a configuration same as the front frame 21 of the prescription eyeglass 2 of the first embodiment. The curvature of the inner eyeglass 5 is not particularly limited as long as it is smaller than the curvature of the front frame 41B of the sunglass 4B.

A method of attaching the inner eyeglass 5B to the back surface side of the front frame 41B of the sunglass 4B in the eyeglass set 1B described above will now be described. Similar to the first embodiment, first, the engagement parts of the left and right arms 214B of the inner eyeglass 5 or the left and right nose pads 215B are pinched with fingers or the like to move the engagement part of the left arm 214B to the right side of the left pass-through hole 216B and move the engagement part of the right arm 214B to the left side of the right pass-through hole 216B. The inner eyeglass 5B is slid towards the front side from the back surface side in the sunglass 4B, and the left projection 43B is inserted to the left pass-through hole 216B and the right projection 43B is inserted to the right pass-through hole 216B. When the cutouts 431B of the left and right projections 43B are exposed to the back surface side of the pass-through hole 216B, the fingers or the like are released from the engagement parts or the nose pads 215B. When the fingers or the like are released, the engagement parts engage the cutouts 431B of the projection 43B. The inner eyeglass 5B is thereby attached to the back surface side of the front frame 41B of the sunglass 4B, as shown in FIGS. 16A and 16B.

Therefore, when the inner eyeglass 5B is attached to the back surface side of the front frame 41B of the sunglass 4B, the inner eyeglass 5B is hidden by the sunglass 4B in front view of the eyeglass set 1B. The eyeglass set 1B has an outer appearance similar to the sunglass in which the front frame is curved at a large curvature so as to extend along the face in front view by forming the sunglass lens 411B of the sunglass 4B to a shape curved at a large curvature so as to extend along the face.

The sunglass lens 411B does not have a function of adjusting the focus. Thus, the adjustment amount of the focus of the eyeglass set 1B does not change even if the curvature of the sunglass lens 411B is changed. Thus, the curvature of the sunglass lens 411B of the eyeglass set 1B is not restricted by the adjustment amount of the focus. The sunglass 4B having a shape curved at a large curvature so as to extend along the face is thus easy to manufacture.

The prescription lens 211B of the inner eyeglass 5B and the sunglass lens 411B overlap when the inner eyeglass 5B is attached to the back surface side of the front frame 41B of the sunglass 4B. The user of the eyeglass set 1B can see objects through the prescription lens 211B and the sunglass lens 411B when the prescription lens 211B and the sunglass lens 411B overlap. Therefore, the eyeglass set 1B can be used as a prescription sunglass having a function of adjusting the focus of the user's eyes by attaching the inner eyeglass 5B to the back surface side of the front frame 41B of the sunglass 4B.

The eyeglass set 1B can be used as a prescription sunglass that is easy to manufacture and has excellent designability.

The detachment of the inner eyeglass 5B from the sunglass 4B is carried out as below. First, the left and right arms 214B are further elastically deformed from the state engaging the cutouts 431B to disengage the cutouts 431B and the engagement parts of the arms 214B, similar to the first embodiment. The inner eyeglass 5B is then slid towards the back side with respect to the sunglass 4B until the projections 43B come out of the pass-through holes 216B. The inner eyeglass 5B is detached from the sunglass 4B when the projections 43B come out of the pass-through holes 216B.

The inner eyeglass 5B is removably attached to the sunglass 4B in the above manner. The eyeglass set 1B can be used as a prescription sunglass of various designs by preparing a plurality of sunglass lenses 4B of various designs, and changing the sunglass lens 4B to be attached to the inner eyeglass 5B. Therefore, the eyeglass set 1B can change an outer appearance according to TPO by changing the sunglass 4B according to TPO. Furthermore, the sunglass 4B can be used as the sunglass itself if the inner eyeglass 5B is detached.

Sixth Embodiment

Figure 18A:
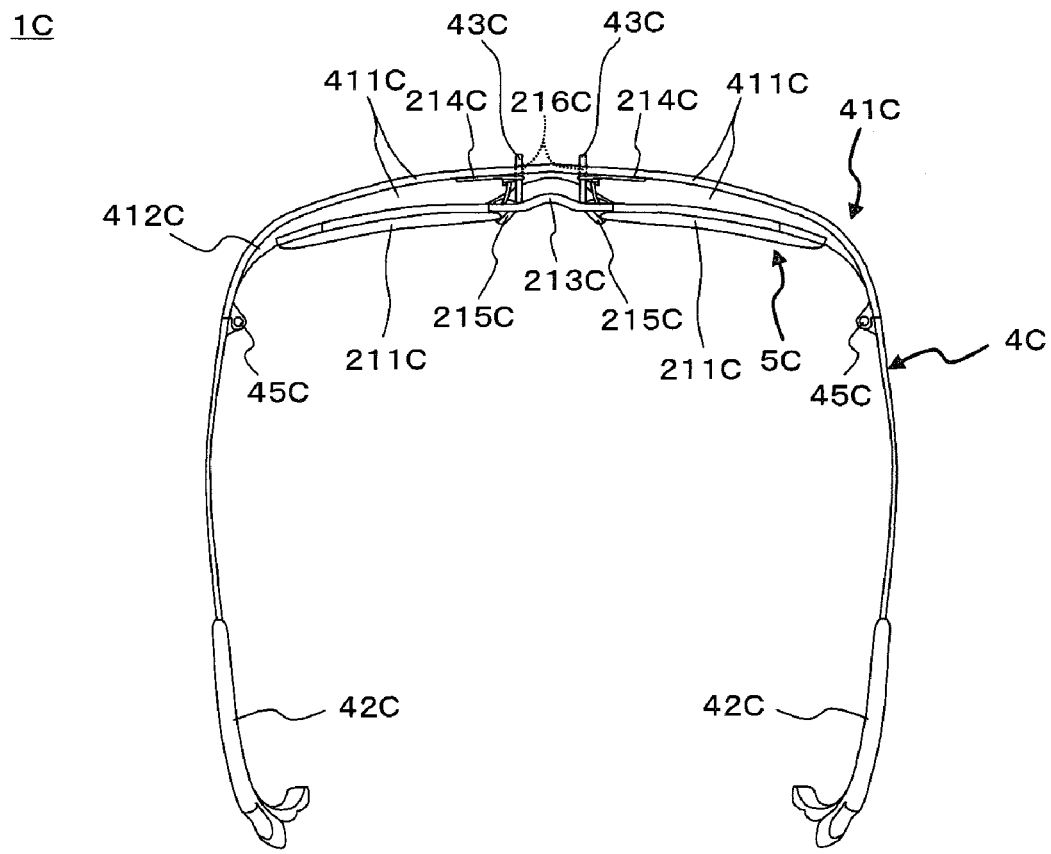
FIG. 18A is a plan view.
Figure 18B:
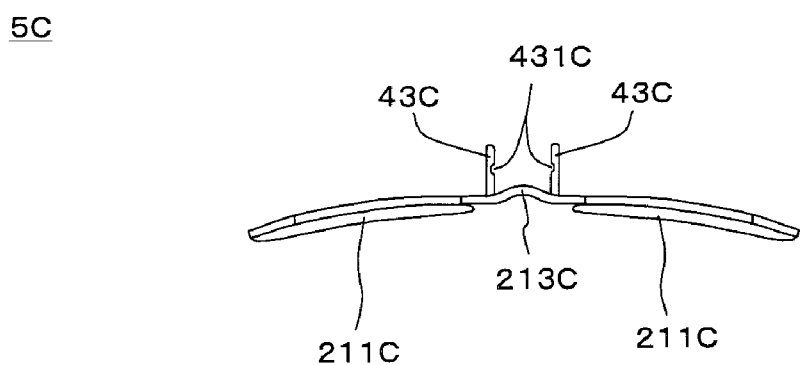
FIG. 18B is a plan view of an inner eyeglass arranged in the eyeglass set.

FIG. 18 (FIGS. 18A and 18B) are outer appearance views of an eyeglass set according to a sixth embodiment. FIG. 18A is a plan view. FIG. 18B is a plan view of an inner eyeglass arranged in the eyeglass set. As shown in FIGS. 18A and 18B, the eyeglass set 1C is equipped with a sunglass 4C including a front frame 41C with a sunglass lens 411C and temples 42C and an inner eyeglass 5C including left and right prescription lenses 211C. The inner eyeglass 5C has a curvature smaller than the front frame 41C of the sunglass 4C and is removably attached to a back surface of the front frame 41C of the sunglass 4C. The eyeglass set 1C differs from the eyeglass set 1B according to the fifth embodiment in that the projections 43C are arranged on the inner eyeglass 5C, and the arms 214C, the nose pads 215C, and the pass-through holes 216C are formed in the sunglass 4C.

As shown in FIG. 18B, the projections 43C formed on the inner eyeglass 5C are formed so as to project towards the front side from the bridge part 213C. The configuration of the projection 43C is the same as the projection 33A of the third embodiment. The projection 43C has a cutout 431C formed on the lateral side. The shape, positioned to be formed, and the size of the cutout 431C are the same as those of the cutout 331A of the third embodiment.

Figure 19A:
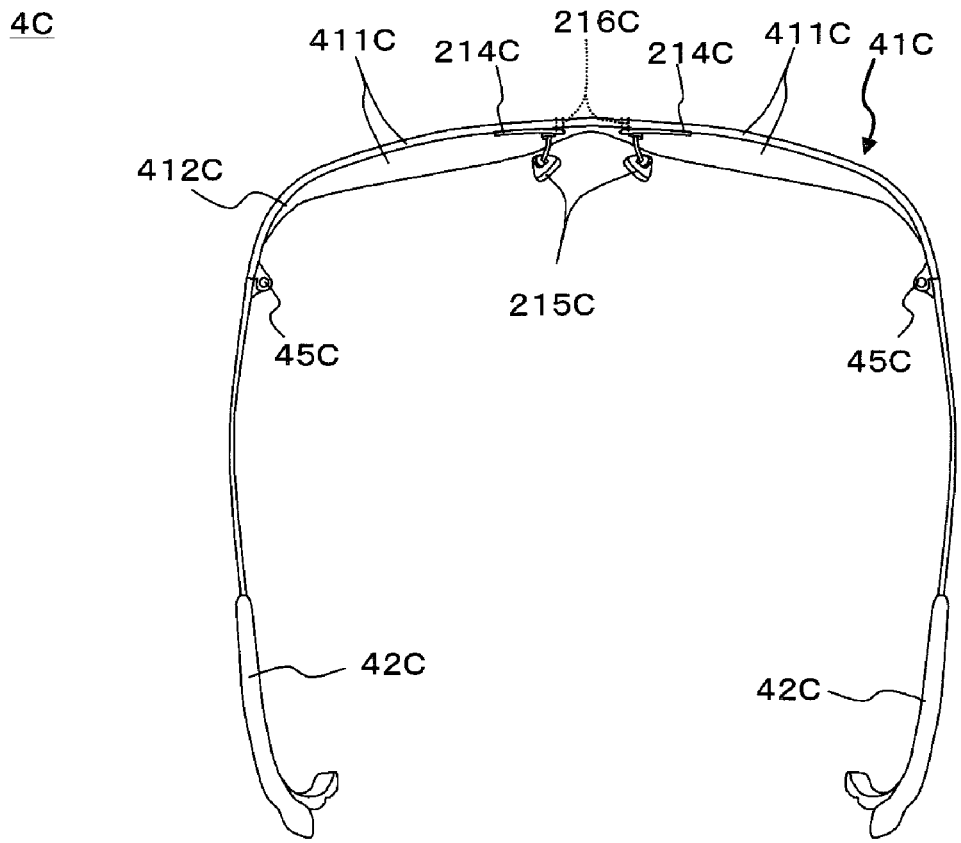
FIG. 19 (FIGS. 19A and 19B) are outer appearance views of the sunglass of the sixth embodiment.
Figure 19B:
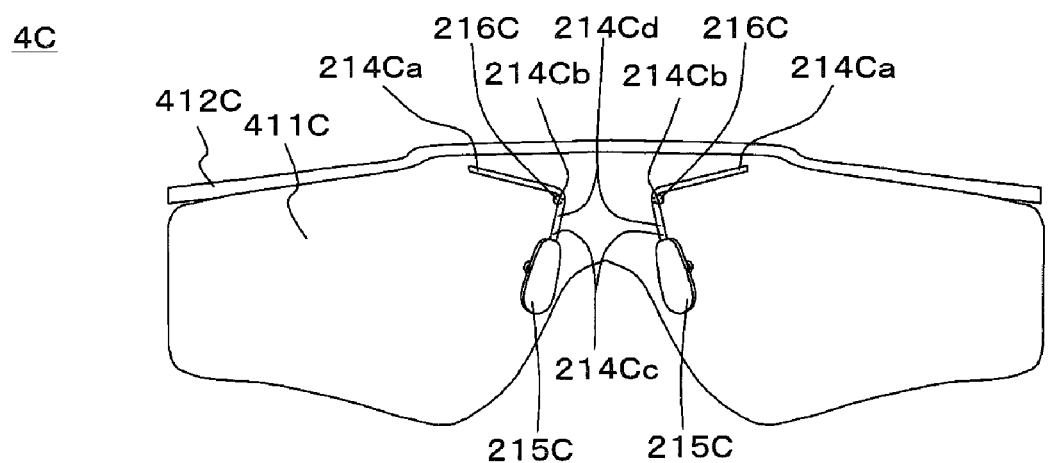

FIG. 19 (FIGS. 19A and 19B) is an outer appearance view of the sunglass 4C. FIG. 19A is a plan view of the sunglass 4C. FIG. 19B is a rear view of the sunglass 4C. As shown in FIG. 19, the sunglass 4C includes hinge structures 45C, left and right arms 214C, left and right nose pads 215C, and pass-through holes 216C in addition to the front frame 41C and the left and right temples 42C. The configuration of the temple 42C and the hinge structure 45C is the same as the temple 42B and the hinge structure 45B of the fifth embodiment.

The front frame 41C includes a rim part 412C in addition to the sunglass lens 411C. The front frame 41C has a configuration same as the front frame 41B of the sunglass 4B of the fifth embodiment other than that the pass-through holes 216C are formed in the sunglass lens 411C.

The left and right arms 214C are formed into a substantially L shape in which the intermediate part 214Cb is bent, similar to the left and right arms 214C of the third embodiment. The left and right arms 214C have the basal ends 214Ca attached to a back surface side of the sunglass lens 411C. The positional relationship of the basal end 214Ca, the intermediate part 214Cb, and the distal end 214Cc of the left and right arms 214C is the same as the first embodiment. The left and right arms 214C have elasticity, and when the left and right arms 214C is elastically deformed in a direction that the bent angle of the intermediate part 214Cb becomes larger, a biasing force acts in a direction that the bent angle becomes smaller, and when the left and right arms 214C is elastically deformed in a direction the bent angle of the intermediate part 214Cb becomes smaller, the biasing force acts in the direction the bent angles becomes larger. The nose pad 215C is attached to the distal end 214Cc of such arm 214C.

The pass-through hole 216C is a hole for passing the sunglass lens 411C in the front and back direction. The pass-through hole 216C is formed at two locations at a central part in a left and right direction of the sunglass lens 411C. A positional relationship of the left and right pass-through holes 216C and the engagement parts 214Cd of the left and right arms 214C is the same as the third embodiment. The spacing of the left and right pass-through holes 216C and the projections 33C is the same.

A method of attaching the inner eyeglass 5C described above to the back surface side of the front frame 41C of the sunglass 4C will now be described. Similar to the first embodiment, first the engagement parts 214Cd of the left and right arms 214C or the nose pads 215C of the sunglass 4C are pinched with fingers or the like to move the engagement part 214Cd of the left arm 214C to the right side of the left pass-through hole 216C and move the engagement part 214Cd of the right arm 214C to the left side of the right pass-through hole 216C. The inner eyeglass 5C is slid towards the front side at the back surface side of the sunglass 4C, and the left projection 43C is inserted to the left pass-through hole 216C and the right projection 43C is inserted to the right pass-through hole 216C. When the front ends of the left and right projections 43C are exposed to the front surface side of the pass-through holes 214C, the fingers or the like are released from the engagement parts 214Cd or the nose pads 215C. When the fingers are released, the engagement parts 214Cd engage the cutouts 431C of the projections 43C. As shown in FIG. 18, the inner eyeglass 5C is thereby attached to the back surface side of the front frame 41C of the sunglass 4C.

The eyeglass set 1C can be attached to the back surface side of the front frame 41C of the sunglass 4C in the above manner. The eyeglass set 1C thus can be used as a prescription sunglass that is easy to manufacture, has excellent designability, and has a function of adjusting the focus of the user's eyes, similar to the eyeglass set 1B according to the fifth embodiment.

The detachment of the inner eyeglass 5C from the sunglass 4C is carried out in the following manner. First, similar to the first embodiment, the left and right arms 214C are further elastically deformed from the state engaging with the cutouts 431C to disengage the cutouts 431C and the engagement parts of the arms 214C. The inner eyeglass 5C is then slid towards the back side with respect to the sunglass 4C until the projections 43C come out of the pass-through holes 216C. The inner eyeglass 5C is detached from the sunglass 4C when the projections 43C come out of the pass-through holes 216C.

The inner eyeglass 5C is removably attached to the sunglass 4C in such manner. The eyeglass set 1C can be used as the prescription sunglass of various designs by preparing a plurality of sunglasses 4C of various designs, and changing the sunglass 4C to be attached to the inner eyeglass 5C. Therefore, the eyeglass set 1C can change the outer appearance according to TPO by changing the sunglass 4C according to TPO. Furthermore, the sunglass 4C can be used as the sunglass itself if the inner eyeglass 5C is detached.

In first to sixth embodiments, the biasing force in opposite directions is applied to the left and right arms by moving the engagement part of the left arm to the right side of the left pass-through hole and moving the engagement part of the right arm to the left side of the right pass-through hole. Another method of applying the biasing force in opposite directions to the left and right arms includes a method of moving the engagement part of the left arm to the left side of the left pass-through hole and moving the engagement part of the right arm to the right side of the right pass-through hole. When such method is adopted, a cutout must be formed on a left side surface of the left projection and the right side surface of the right projection.

In first to sixth embodiments, a manner of engaging the arms to the projections inserted to the pass-through holes has been described. However, in the eyeglass set according to the present invention, the state of the projection to be engaged with the arm is not limited to the state inserted to the pass-through hole. For instance, in the first embodiment, the arms 214 may be engaged to the projections 33 passed under the bridge part 213 and the elongate member 22, and exposed to the back side of the front frame 21 of the prescription eyeglass.

The invention claimed is:

1. An eyeglass set comprising:
a prescription eyeglass including a front frame with left and right prescription lenses, and left and right temples; and
a front sunglass lens member having a curvature larger than the front frame of the prescription eyeglass and being removably attached to a front surface side of the front frame of the prescription eyeglass; wherein
the front sunglass lens member includes projections projecting towards the back side and each being formed with a cutout on the lateral side;
the prescription eyeglass further includes left and right elastic arms respectively attached with a nose pad; and
the left and right arms are biased in opposite directions to each other and are elastically engaged to the cutouts of the projections while being elastically deformed in left and right opposite directions so that the front sunglass lens member attaches to the front surface side of the front frame of the prescription eyeglass.

2. An eyeglass set comprising:
a prescription eyeglass including a front frame with left and right prescription lenses, and left and right temples; and
a front member removably attached to a front surface side of the front frame of the prescription eyeglass; wherein
the front member includes,
a sunglass lens having a curvature larger than the front frame of the prescription eyeglass,
projections projecting towards the back side and each being formed with a cutout on the lateral side, and
an attachment part for pivotally connecting the sunglass lens and the projections and enabling the sunglass lens to switch to between a state of being positioned on the front surface side of the front frame of the prescription eyeglass and a state of being flipped upward from the state positioned on the front surface side by pivoting the sunglass lens with respect to the projections;
the prescription eyeglass further includes left and right elastic arms respectively attached with a nose pad; and
the left and right arms are biased in opposite directions to each other and are elastically engaged to the cutouts of the projections while being elastically deformed in left and right opposite directions so that the front member attaches to the front surface side of the front frame of the prescription eyeglass.

3. The eyeglass set according to claim 1 or 2, wherein
the prescription eyeglass further includes pass-through holes extending in a front and back direction;
the cutouts are formed at positions of being exposed to the outside of the pass-through holes while the projections are inserted to the pass-through holes; and
the left and right arms elastically engage the cutouts when the projections are inserted to the pass-through holes.

4. An eyeglass set comprising:
a prescription eyeglass including a front frame with left and right prescription lenses, and left and right temples; and
a front sunglass lens member having a curvature larger than the front frame of the prescription eyeglass and being removably attached to a front surface side of the front frame of the prescription eyeglass; wherein
the prescription eyeglass further includes projections projecting towards the front side and each being formed with a cutout on the lateral side;
the front sunglass lens member further includes left and right elastic arms respectively attached with a nose pad; and
the left and right arms are biased in opposite directions to each other and are elastically engaged to the cutouts of the projections while being elastically deformed in left and right opposite directions so that the front sunglass lens member attaches to the front surface side of the front frame of the prescription eyeglass.

5. The eyeglass set according to claim 4, wherein
the front sunglass lens member further includes pass-through holes extending in a front and back direction;
the cutouts are formed at positions of being exposed to the outside of the pass-through holes while the projections are inserted to the pass-through holes; and
the left and right arms elastically engage the cutouts when the projections are inserted to the pass-through holes.

6. An eyeglass set comprising:
a prescription eyeglass including a front frame with left and right prescription lenses, and left and right temples; and
a front member removably attached to a front surface side of the front frame of the prescription eyeglass; wherein
the front member includes,
a sunglass lens having a curvature larger than the front frame of the prescription eyeglass,
left and right elastic arms respectively attached with a nose pad, and
an attachment part for pivotally connecting the sunglass lens and the left and right arms and enabling the sunglass lens to switch to between a state of being positioned on the front surface side of the front frame of the prescription eyeglass and a state of being flipped upward from the state positioned on the front surface side by pivoting the sunglass lens with respect to the left and right arms;
the prescription eyeglass further includes projections projecting towards the front side and each being formed with a cutout on the lateral side; and
the left and right arms are biased in opposite directions to each other and are elastically engaged to the cutouts of the projections while being elastically deformed in left and right opposite directions so that the front member attaches to the front surface side of the front frame of the prescription eyeglass.

7. The eyeglass set according to claim 6, wherein
the front member further includes a coupling strip with pass-through holes extending in the front and back direction;
the attachment part pivotally connects the sunglass to the left and right arms and the coupling strip, and pivots the sunglass lens with respect to the left and right arms and the coupling strip to switch the sunglass lens between the state of being positioned on the front surface side of the front frame of the prescription eyeglass and the state of being flipped upward from the state positioned on the front surface side;
the cutouts are formed at positions of being exposed outside the pass-through holes while the projections are inserted to the pass-through holes; and
the left and right arms elastically engage the cutouts when the projections are inserted to the pass-through holes.

8. An eyeglass set comprising:
a sunglass including a front frame with a sunglass lens, and temples; and an inner eyeglass including left and right prescription lenses, having a curvature smaller than the front frame of the sunglass, and being removably attached to a back surface side of the front frame of the sunglass; wherein the sunglass further includes projections projecting towards the back side and each being formed with a cutout on the lateral side;

the inner eyeglass further includes left and right elastic arms respectively attached with a nose pad; and the left and right arms are biased in opposite directions to each other and are elastically engaged to the cutouts of the projections while being elastically deformed in left and right opposite directions so that the inner eyeglass attaches to the back surface side of the front frame of the sunglass.

9. The eyeglass set according to claim 8, wherein the inner eyeglass further includes pass-through holes extending in a front and back direction;

the cutouts are formed at positions of being exposed to the outside of the pass-through holes while the projections are inserted to the pass-through holes; and the left and right arms elastically engage the cutouts when the projections are inserted to the pass-through holes.

10. An eyeglass set comprising:

a sunglass including a front frame with a sunglass lens, and temples; and an inner eyeglass including left and right prescription lenses, having a curvature smaller than the front frame of the sunglass, and being removably attached to a back surface side of the front frame of the sunglass; wherein the inner eyeglass further includes projections projecting towards the front side and each being formed with a cutout on the lateral side;

the sunglass further includes left and right elastic arms respectively attached with a nose pad; and the left and right arms are biased in opposite directions to each other and are elastically engaged to the cutouts of the projections while being elastically deformed in left and right opposite directions so that the inner eyeglass attaches to the back surface side of the front frame of the sunglass.

11. The eyeglass set according to claim 10, wherein the sunglass further includes pass-through holes extending in a front and back direction;

the cutouts are formed at positions of being exposed to the outside of the pass-through holes while the projections are inserted to the pass-through holes; and the left and right arms elastically engage the cutouts when the projections are inserted to the pass-through holes.

* * * * *